US011885166B2

(12) United States Patent
Bucklin et al.

(10) Patent No.: US 11,885,166 B2
(45) **Date of Patent: *Jan. 30, 2024**

(54) CONDITION ACTIVATED DOOR SPRING

(71) Applicant: Upton Ventures Inc., Dover, DE (US)

(72) Inventors: J. D. Bucklin, Olympia, WA (US); Michael Gindhart, Lacey, WA (US); Daniel Norwitz, Seattle, WA (US)

(73) Assignee: Upton Ventures, Inc., Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/813,580

(22) Filed: Jul. 19, 2022

(65) Prior Publication Data

US 2023/0003067 A1 Jan. 5, 2023

Related U.S. Application Data

(63) Continuation-in-part of application No. 16/675,745, filed on Nov. 6, 2019, now Pat. No. 11,549,296.

(51) Int. Cl.
*E05F 1/00* (2006.01)
*E05F 1/12* (2006.01)

(52) U.S. Cl.
CPC .............. *E05F 1/006* (2013.01); *E05F 1/004* (2013.01); *E05F 1/1207* (2013.01); *E05Y 2400/52* (2013.01); *E05Y 2800/70* (2013.01)

(58) Field of Classification Search
CPC ......... E05F 1/006; E05F 1/1207; E05F 1/004; E05F 15/72; E05B 65/104; Y10T 16/22
See application file for complete search history.

(56) References Cited

U.S. PATENT DOCUMENTS

| | | | | |
|---|---|---|---|---|
| 3,559,232 A * | 2/1971 | Crane | E05F 15/72 | 267/156 |
| 4,161,804 A * | 7/1979 | D'Hooge | E05B 65/104 | 292/164 |
| 4,324,425 A | 4/1982 | Logan | | |
| 4,339,845 A * | 7/1982 | Newlon | E05F 1/1215 | 16/300 |
| 4,414,777 A | 11/1983 | Masacchia | | |
| 4,583,262 A * | 4/1986 | Werner | E05F 1/1215 | 16/300 |
| 4,726,613 A | 2/1988 | Foshee | | |
| 4,884,832 A | 5/1989 | Bungard | | |
| 5,058,236 A * | 10/1991 | Henson | E05D 7/0027 | 16/248 |
| 5,061,022 A | 10/1991 | Meriwether | | |
| 5,121,950 A | 6/1992 | Davidian | | |
| 5,380,053 A | 1/1995 | Saino | | |

(Continued)

*Primary Examiner* — Justin B Rephann
(74) *Attorney, Agent, or Firm* — Stephen S. Zimowski

(57) ABSTRACT

The present invention provides device that replaces the hinge pin in a door hinge to provide a door with automatic closing technology, triggered by the device's detection of an adverse condition in the surrounding environment, such as a fire or gas leak, the device including a lower extension pin that slides into the space conventionally occupied by the hinge pin, first and second arms that apply opposing rotational force to the door and door jam, respectively, when the device is activated, and a condition detection module employing at least one sensor and an activation system to activate the device upon the sensor's detection of an adverse environmental condition to close the door.

20 Claims, 19 Drawing Sheets

(56) References Cited

U.S. PATENT DOCUMENTS 5,408,726 A * 4/1995 Kent .................. E05D 11/1007 16/329
5,427,420 A 6/1995 Moore
5,492,208 A 2/1996 Goossens
5,551,187 A 9/1996 Brouwer
5,690,371 A 11/1997 Turnbull
5,774,938 A * 7/1998 Kent .................. E05D 11/1007 16/332
5,782,509 A 7/1998 Uyeda
6,092,334 A * 7/2000 Kim ........................ E05F 1/006 16/334
6,484,784 B1 * 11/2002 Weik, III ................. A62C 2/24 49/7
6,615,544 B1 9/2003 Tlemcani et al.
7,028,431 B2 4/2006 Tlemcani et al.
7,488,012 B2 2/2009 Eller et al.
8,375,519 B1 * 2/2013 Cooper .................. E05F 1/006 16/386
8,844,195 B2 9/2014 Cox et al.
8,955,194 B2 2/2015 Teta et al.
8,979,143 B1 3/2015 Lin
9,799,462 B2 10/2017 Feil et al.
9,890,964 B2 2/2018 Teoh
10,626,651 B2 * 4/2020 Chang ....................... E05F 3/20
2004/0045219 A1 3/2004 Tlemcani et al.
2011/0271484 A1 11/2011 Irwin
2013/0247329 A1 * 9/2013 Teta ........................ E05F 1/006 16/48.5
2019/0085606 A1 * 3/2019 Teta ...................... E05F 1/1207
2019/0330903 A1 * 10/2019 Talpe .................... E05F 1/1207
2019/0390503 A1 * 12/2019 Teta ...................... E05F 1/1207
2020/0131824 A1 * 4/2020 Opgenorth ............ E05F 1/1215
2020/0177051 A1 * 6/2020 Abe ........................ E05D 11/00
2021/0025215 A1 * 1/2021 Sellinger ................. E05F 15/63

* cited by examiner

TABLE 1

| Alloy | Melting point | Bismuth | Lead | Tin | Indium | Cadmium | Thallium |
|---|---|---|---|---|---|---|---|
| Wood's metal | 70 °C (158 °F) | 50% | 26.7% | 13.3% | – | 10% | – |
| Rose's metal | 98 °C (208 °F) | 50% | 25% | 25% | – | – | – |
| Field's metal | 62 °C (144 °F) | 32.5% | – | 16.5% | 51% | – | – |
| Cerrosafe | 74 °C (165 °F) | 42.5% | 37.7% | 11.3% | – | 8.5% | – |
| Cerrolow 136 | 58 °C (136 °F) | 49% | 18% | 12% | 21% | – | – |
| Cerrolow 117 | 47.2 °C (117 °F) | 44.7% | 22.6% | 8.3% | 19.1% | 5.3% | – |
| Bi-Pb-Sn-Cd-In-Tl | 41.5 °C (107 °F) | 40.3% | 22.2% | 10.7% | 17.7% | 8.1% | 1.1% |

FIG. 11

FIG. 14A
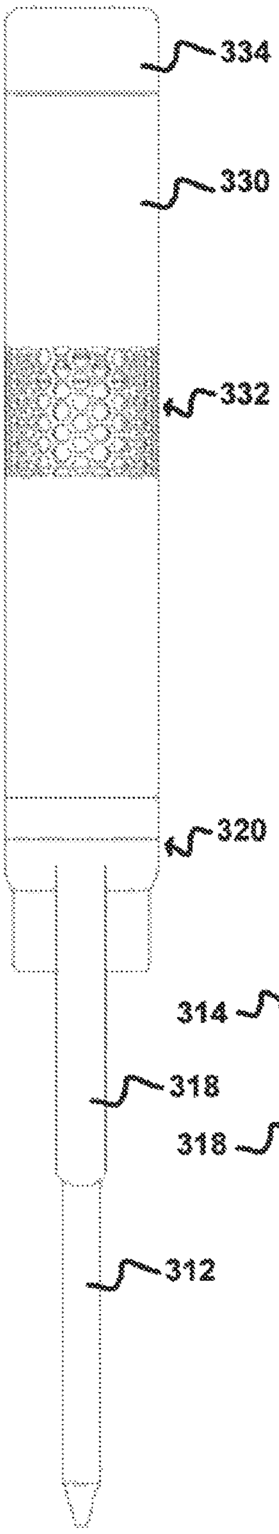
FIG. 14B
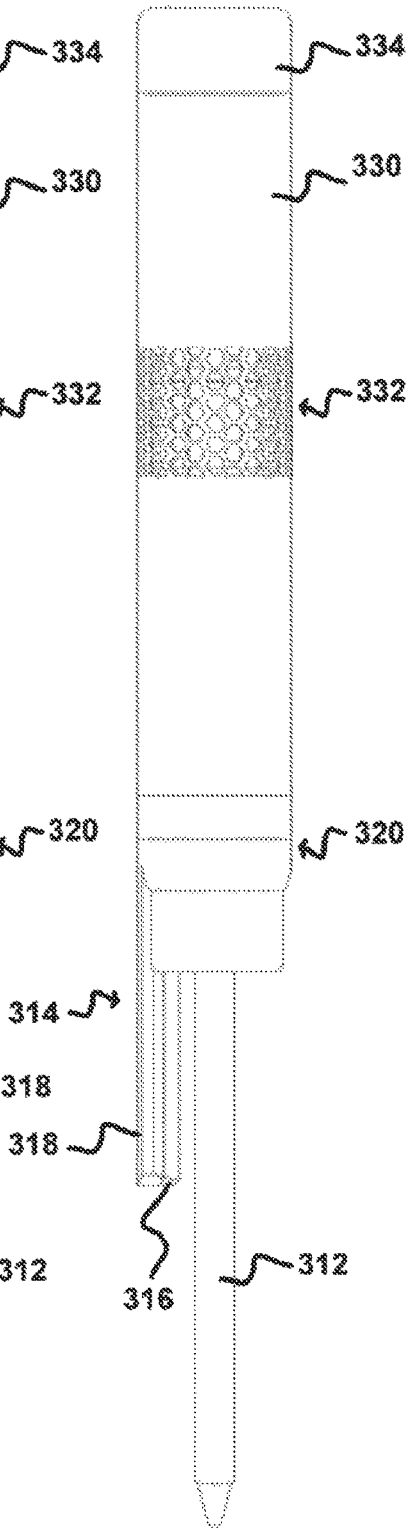
FIG. 14C
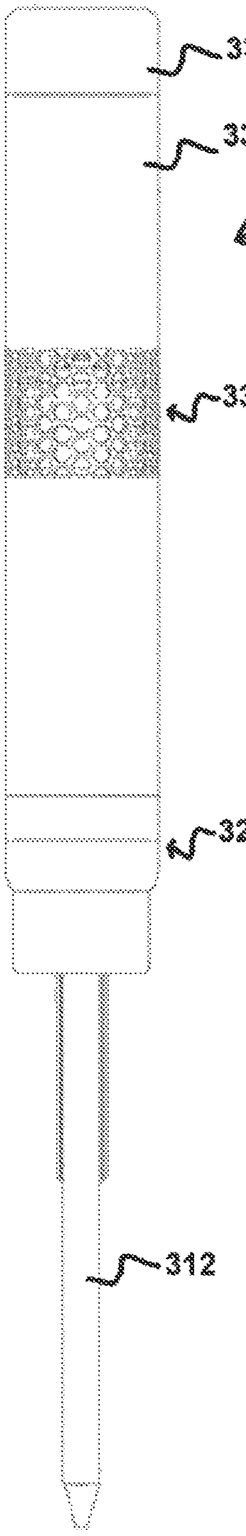
FIG. 14D
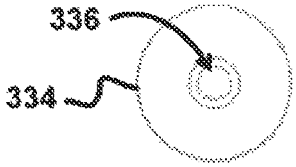
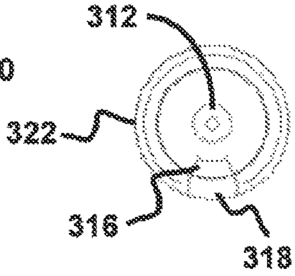
FIG. 14E

CONDITION ACTIVATED DOOR SPRING

FIELD OF THE INVENTION

The present invention relates to safety door hinge pin springs, and, more particularly, to a temperature activated door spring for promoting fire safety. Even more particularly, the present invention relates to a replacement insert for a door hinge, specifically a spring-powered insert, that replaces a door's existing hinge pin and applies stored mechanical force to close the attached door to prevent ingress of adverse conditions.

BACKGROUND OF THE INVENTION

According to a September 2017 report from the National Fire Protection Agency (NFPA) U.S. fire departments responded to an estimated average of 358,500 home structure fires per year during 2011-2015. These fires caused an average of 2,510 civilian deaths, 12,300 civilian injuries, and $6.7 billion in direct property damage per year. Seventy percent of reported home fires and 84% of the home fire deaths occurred in one- or two-family homes. The remainder occurred in apartments or other multi-family housing. Estimates were derived from the U.S. Fire Administration's National Fire Incident Reporting System (NFIRS) and the National Fire Protection Association's fire department experience survey. (NFPA, "Home Structure Fires," 2017).

Further, according to the same report, Home fire deaths occur more often in cooler months and between 11:00 p.m. and 7:00 a.m. In 2011-2015, 47% of home structure fires and 56% of home structure fire deaths occurred in the five months of November through March. Reported home fires peaked around the dinner hours of 5:00 to 8:00 p.m. While just one-fifth (20%) of reported home fires occurred between 11:00 p.m. and 7:00 a.m., half (52%) of the home fire deaths resulted from fires reported during these hours (Id).

As is known by fire-fighting professionals and fire departments, having a bedroom door closed can protect belongings inside even when temperatures reach 1,000 degrees. Having one's door closed can make a 900 degree difference in a fire. As a result having a door that automatically closes can be a life saver. While fire doors are required to separate a living space from a garage, for example, standard fire doors are kept in the closed position unless propped open (which is not recommended). For bedrooms and other interior rooms of a home it would be desirable to have the option of keeping a door open without the need for a door jam or the like.

Such devices are available but have several drawbacks. For example, U.S. Pat. No. 8,955,194 issued Feb. 17, 2015 to Teta teaches a closure mechanism for a door actuated during a fire, which causes the door to automatically close. However, Teta teaches a mechanism that requires replacement of an entire hinge with a new hinge that includes a spring mechanism within the hinge. As a result, it is cumbersome to install since the entire hinge must be replaced and it requires a fairly complex set of internal parts.

In order to overcome the drawbacks of the prior art, the disclosure herein describes a closure mechanism for a door that is actuated during a fire. The closure mechanism automatically closes the door. Installation of the closure mechanism is easily accomplished by placing it on an existing door hinge and holding it in place by a hinge pin.

The disclosure further describes a replacement insert for a door hinge, particularly a spring-powered insert, that replaces a door's existing hinge pin and applies stored mechanical force to close the door to prevent ingress of adverse conditions, such as fire, gas, smoke, biohazards, and the like. Indeed, there exists no known automatic release door closers in hinge pin replacement form that will close a door in case of such adverse environmental conditions without intervention. Likewise, there exists no known device for an electronically triggered automatic door closer module with purely mechanical failsafe backup for abnormal environmental conditions.

SUMMARY OF THE INVENTION

This summary is provided to introduce, in a simplified form, a selection concepts that are further described below in the Detailed Description. This summary is not intended to identify key features of the claimed subject matter, nor is it intended to be used as an aid in determining the scope of the claimed subject matter.

Disclosed herein is a temperature activated door spring device including a spring having a coil, an upper arm and a lower arm contiguous with the coil. The coil includes an inner hinge pin hole and has a circumferential edge sized to mount on the top of a hinge knuckle. A collar is affixed within the inner hinge pin hole wherein the inner hinge pin hole is encompassed by the collar and is sized to accept an inserted hinge pin. A pellet hole is located proximate an extended end of the upper arm, wherein the pellet hole is sized to accept a fusible pellet. An upper portion of the pellet hole traverses through the upper arm and a lower portion of the pellet hole traverses through the lower arm so that when a fusible pellet is inserted into the pellet hole it holds the upper arm and the lower arm together in a spring loaded position.

The present invention's intended purpose is to prevent or slow the spread or ingress of hazardous environmental conditions by closing a door or doors automatically and without manual intervention or input when an adverse condition is detected. The present invention accomplishes this purpose by providing a preferably spring-powered replacement insert for a door hinge. The replacement insert applies stored mechanical force to close the associated door to prevent movement of the adverse condition from room to room.

Adverse conditions that can trigger the present invention include, but are not limited to, temperature or humidity, the presence of fire, gas, and/or smoke, the presence of volatile compounds, contaminations, allergens, particulate and atomized compounds and/or vapors, carcinogenic compounds, and airborne biohazards, for example. Other conditions that may trigger the device of the present invention, in preferable embodiments, include detection of intrusion, AI analysis, and/or predicted trends in the environment. Some preferable embodiments of the device may additionally be triggered due to light or sound conditions, through ultrasound or infrasound detection, and/or by radio or electromagnetic radiation detection or by other electronic triggers, such as radio, optical, sonic, ultrasonic, or quantum methods of communication.

The device includes a spring that is preferably pretensioned in manufacturing and retained using a quick-release rachet mechanism. The quick release is activated preferably electronically through an onboard controller that reads data from onboard sensors and receives signals from remote activators. Upon receiving an activation condition, the onboard controller activates the device's internal motor, which is connected to a partial free rotation split junction clutch that allows for limited free rotation before engaging a driving spur gear. The driving spur gear interfaces to a mating set of teeth on a mechanical switch that is connected to the affector shaft. The affector shaft includes a hemisection keyway, and when the affector shaft rotates the hemisection keyway clear of the ratchet pawl ramping it away from the ratchet teeth, this disengages the ratchet and releases the spring potential. The spring thus imparts leverage force to the door hinge, closing the door and impeding the movement of the adverse condition(s) through the doorway.

In case of electronic trigger failure, preferable embodiments of the present invention's device include a purely mechanical failsafe backup consisting of a fusible shunt and a trigger leaf operating in concert with a secondary spring. When the device detects certain adverse conditions, particularly thermal adverse conditions indicating the presence of fire, the fusible shunt releases and allows the secondary spring to apply torsion to rotate the mechanical switch, thereby releasing the main spring to close the door.

Notably, preferable embodiments of the device are also capable of interfacing with similar and dissimilar devices, operating in concert and/or controlling such other devices to assist in preventing movement of adverse conditions by closing doors. For example, the present invention may interface with a building's fire detection systems. Such preferable embodiments may interface with such other devices' sensors or other monitoring features to trigger activation upon detection of an adverse condition by such other devices.

To accomplish the objectives of the present invention, preferable embodiments of the device include a concentric axial metal dowel pin sized similar to existing door hinge pins that retain the two leaves of a hinge. The device can thus be used to replace such hinge pins on one or more hinges of any number of doors within a location, arming each such door with automatic closing technology in the case of an adverse environmental condition. Preferable embodiments of the device feature two counter rotating pins, the first of which is attached to a pully in which a ring gear of ratchet teeth rotates around a smooth molded bearing. Each counter rotating pin is preferably peripherally axially mounted and coincidental when homed. Upon detection of an adverse condition activating the device, the two peripherally mounted axial pins counter rotate and impart force against the door and its components, such as door hinges, door jam, molding, etc., driving the door into a closed position. The device also includes a mechanically retained spring that preferably stores a sufficient amount of energy to close an unhindered door of typical size and weight with or without electrical potential or manual intervention.

The main actuation spring coils around the central core of the unit below the triggers and above the rotating arms of the device. The main spring is retained at the top end within a notch on the overhanging cover of the central core, and the lower end of the spring is retained with a ledge in the upper part of the ring gear. The present invention's device also preferably includes a resettable ratchet quick release mechanism that allows for re-setting and winding of the main spring, which provides the closing force upon activation due to detection of an adverse condition.

Preferable embodiments of the present invention also include a shaft with a keyway that, when rotated, mechanically draws the ratchet mechanism pawl into the free position to allow the main spring energy to release and close the door. When the shaft is in the home position, the keyway allows the spring to drive the ratchet mechanism pawl into the ratchet teeth, preventing unwinding but permitting winding of the device.

Preferable embodiments of the device further include a switch lever on top of the ratchet affector shaft. A spool concentric to the ratchet affector shaft hosts the mechanical failsafe spring, and above the pool and mechanical failsafe spring is preferably a ledge with a center pin to retain a diametrically aligned toroidal disc magnet. The switch lever also preferably features an arm with a right angle vertical surface to receive the mechanical backup trigger spring and features spur gear teeth beneath and concentrically radial to the affector shaft.

Preferable embodiments of the device also include a spur gear coupled to a motor with a limited free rotation split junction clutch, which allows the motor to drive the switch to home or activated positions. While in the home position, the clutch permits activation of the switch by the backup failsafe without engaging the motor or being forced to overcome the idle motor resistance.

Preferable embodiments of the present invention also feature a temperature responsive mechanical failsafe that operates to activate the device in the event of an electronic trigger failure despite the detection of an adverse condition. Accordingly, the mechanical failsafe operates as a secondary trigger to activate the device and close the door in the event of a fire despite the electronic trigger's failure.

The mechanical failsafe preferably includes a cylindrical heatsink that spans the circumference of the middle body housing. A fusible shunt is preferably attached to the heatsink, and a trigger leaf is preferably attached to the shunt. This design retains a small spring that is situated concentrically, with the spool of the switch and its other arm braced against the housing of the middle body. When the heatsink reaches the failsafe temperature, the fusible shunt releases the trigger and the spring pushes the switch into the tripped position, releasing the ratchet and the main spring's stored energy to close the door.

Preferable embodiments of the device also include an electronic angle sensor that tracks the position of the switch through a mounted, diametrically opposed ring magnet, which detects the motor angle and mechanical trip. Some preferable embodiments further include redundant temperature sensors located on the circuit board above the switch mechanism. In some preferable embodiments, the electronically triggered portion may thus be triggered by onboard or remote sensing and by local or remote data processing.

The device is also preferably capable of electronically, manually, or mechanically resetting the ratchet retainer mechanism after activation by re-applying the stored tension in the main actuation spring. In such embodiments, the device may be wound to re-tension the main actuation spring, and the ratchet holds the device in position as the winding occurs, storing the tensioned energy unless and until the device is activated once again. Preferable embodiments of the device also have a replaceable smart control module containing one or more primary and secondary power cells or other energy storage, capture, and/or generation features.

In preferable embodiments with said smart control module, the smart control module preferably includes one or more processing units and one or more communication modules employing communication methods, such as sound, ultrasound, infrasound, optical, radio, and/or quantum communication and/or other electromagnetic spectrum communication.

Preferable embodiments of the device also include one or more sensors, which are preferably in electronic communication with the smart control module, to detect adverse conditions requiring activation of the device. Such sensors include those capable of detecting environmental temperature and/or humidity, the presence of gas, smoke, and other volatile compounds and contaminations, allergens, airborne biohazards, and the like. Upon detection of such conditions, the sensors preferably communicate with the smart control module, which in turn activates the device to close the door.

Preferable embodiments of the device are also capable of monitoring and reporting current and past conditions to other devices in electronic communication therewith, preferably though the smart control module. The device is also preferably capable of receiving communications from such devices, which may be used to trigger activation of the device upon receipt of communications indicating an adverse condition from another device.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

FIG. 11 is a table listing various fusible metals useful for making the fusible pellet.

FIG. 14A depicts a perspective view from the front of the device according to the preferable embodiments of the present invention depicted in FIGS. 12-13.

FIG. 14B depicts a perspective view from the side of the device according to the preferable embodiments of the present invention depicted in FIGS. 12-13 and 14A.

FIG. 14C depicts a perspective view from the back of the device according to the preferable embodiments of the present invention depicted in FIGS. 12-13 and 14A-B.

FIG. 14D depicts a perspective view from above of the device according to the preferable embodiments of the present invention depicted in FIGS. 12-13 and 14A-C.

FIG. 14E depicts a perspective view from below of the device according to the preferable embodiments of the present invention depicted in FIGS. 12-13 and 14A-D.

Figure 1:
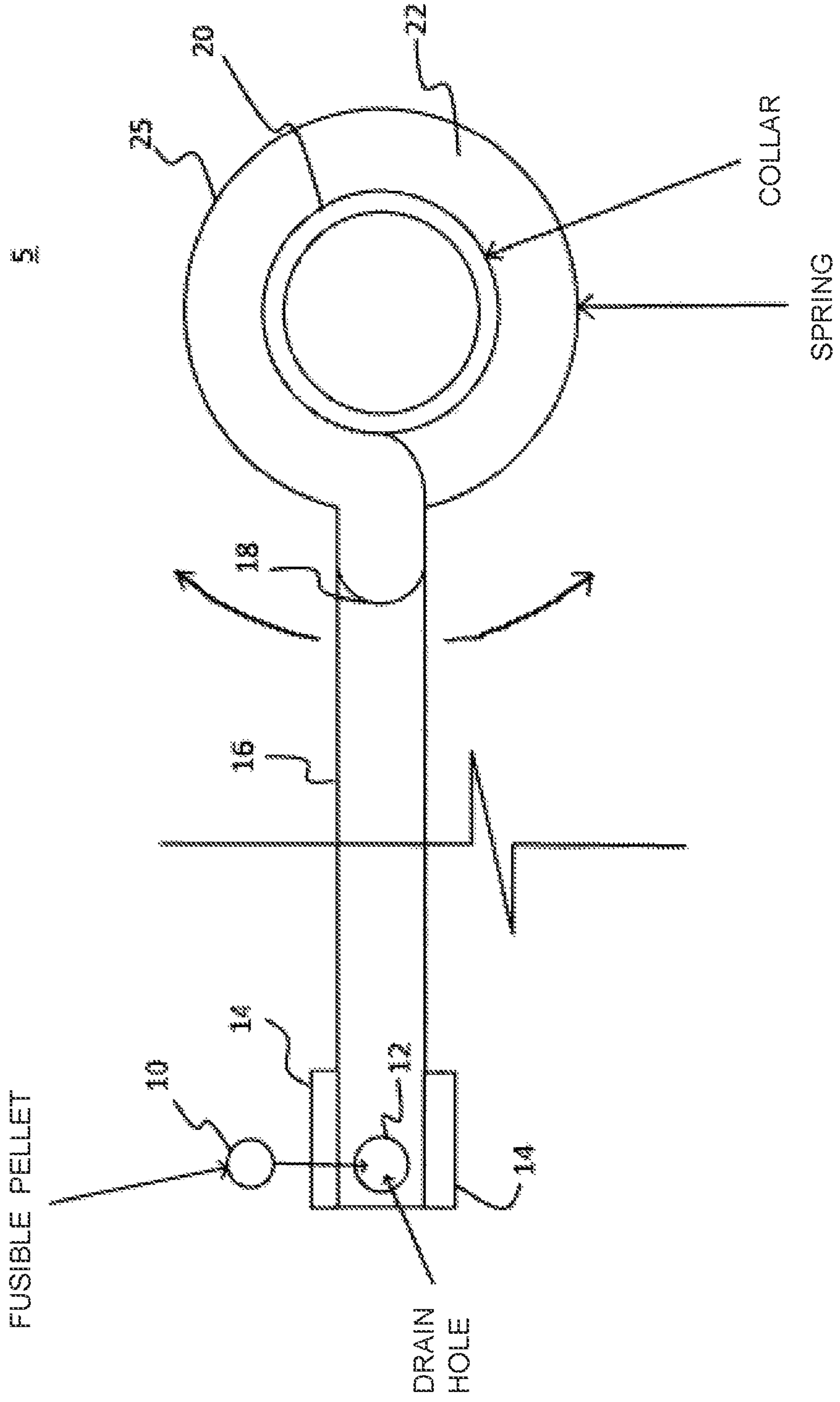
FIG. 1 schematically illustrates a top view of one example of a temperature activated door spring.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

The following disclosure describes an apparatus for a safety door hinge pin spring. Several features of methods and systems in accordance with example embodiments are set forth and described in the figures. It will be appreciated that methods and systems in accordance with other example embodiments can include additional procedures or features different than those shown in the figures. Example embodiments are described herein with respect to temperature activated spring hinges having a pair of spring activated closure arms. However, it will be understood that these examples are for the purpose of illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one example" or "in an embodiment" in various places throughout this specification are not necessarily all referring to the same embodiment or example. Furthermore, the particular features, structures, or characteristics may be combined in any suitable manner in one or more embodiments.

Definitions

Generally, as used herein, the following terms have the following meanings:

The articles "a" or "an" and the phrase "at least one" as used herein refers to one or more.

As used herein, "plurality" is understood to mean more than one. For example, a plurality refers to at least two, three, four, five, ten, 25, 50, 75, 100, 1,000, 10,000 or more.

"Obtaining" is understood herein as manufacturing, purchasing, or otherwise coming into possession of.

Referring now to FIG. 1, a top view of one example of a temperature activated door spring is schematically illustrated. A temperature activated door spring 5 includes a spring 22 having a contiguous upper arm 16 with a pellet hole 12 proximate the end of the upper arm 16. The pellet hole 12 is sized to accept a fusible pellet 10. The upper arm 16 has a first bumper 14 attached proximate the end. A second bumper 14 is attached to a contiguous lower arm 17 as illustrated in FIG. 2.

Figure 2:
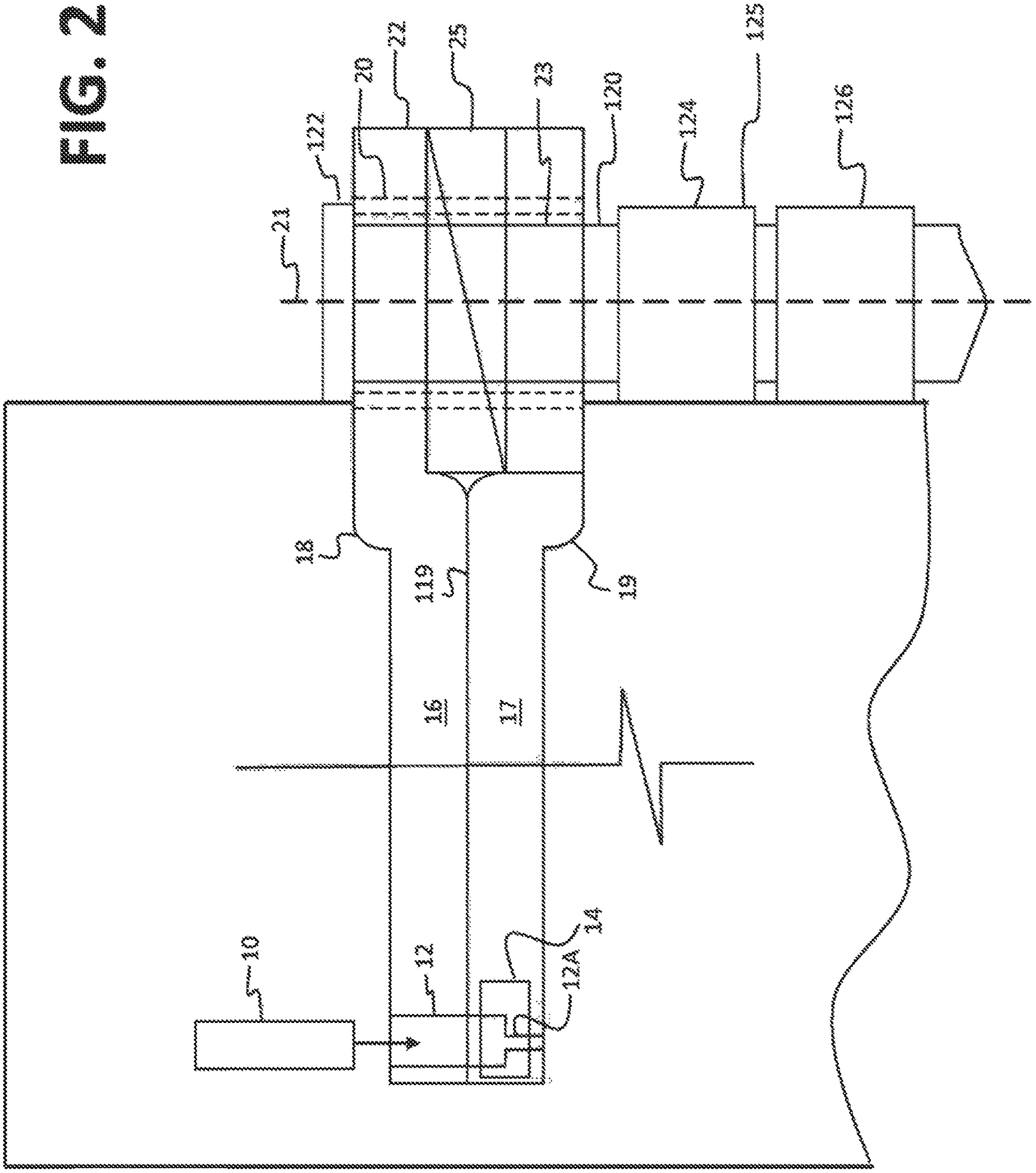
FIG. 2 schematically illustrates a side view of one example of a temperature activated door spring.

Referring now to FIG. 2, a side view of one example of a temperature activated door spring is schematically illustrated. The spring 22 includes a coil 25. Coil 25 is constructed to form upper arm 16 at a top end and a lower arm 17 at a bottom end. The upper arm 16 and the lower arm 17 are elongated in a direction generally at a right angle to a central axis 21 projected through the center of the collar 20. Both arms include a shoulder, 18, 19 respectively shape to allow the upper and lower arms to substantially abut each other along an interior surface 119. Coil 25 includes a hinge pin hole 23 around which the spring is coiled. A collar 20 is affixed within the pin hole 23. The hinge pin hole 23 is encompassed by the collar 20 and is sized to accept an inserted hinge pin 120. The hinge pin 120 includes a top 122 where the top 122 has a diameter larger than the diameter of the collar 20. In this way the hinge pin 120 is held from falling through the hinge pin hole 23.

Still referring to FIG. 2, the lower arm 17 includes a lower bumper 14 attached proximate the end of the lower arm 17. The pellet hole 12 includes a drain hole 12A in a lower portion. A portion of the pellet hole 12 traverses through the upper arm 16 and a lower portion of the pellet hole 12 including the drain hole 12A traverses partially through the lower arm 17 when the upper arm and lower arm are aligned in a locking position. As shown by the downward pointing arrow, when the fusible pellet 10 is inserted into the pellet hole 12 it holds the upper arm 16 and the lower arm 17 together in a closed mode. In one example, the pellet hole 12 may include a narrower portion 12A forming a seat for holding the fusible pellet while still allowing for drainage. When installed into a door hinge 125, the hinge pin 120 engages the temperature activated door spring 5 with the hinge 125 when inserted into knuckles 124, 126 which form part of the hinge. It will be recognized that a hinge can have more than 2 such knuckles and it is intended that the hinge pin is long enough to engage all of the knuckles on most door hinges. When installed, the upper and lower arms will be located proximate to one side of a door 7.

Figure 3:
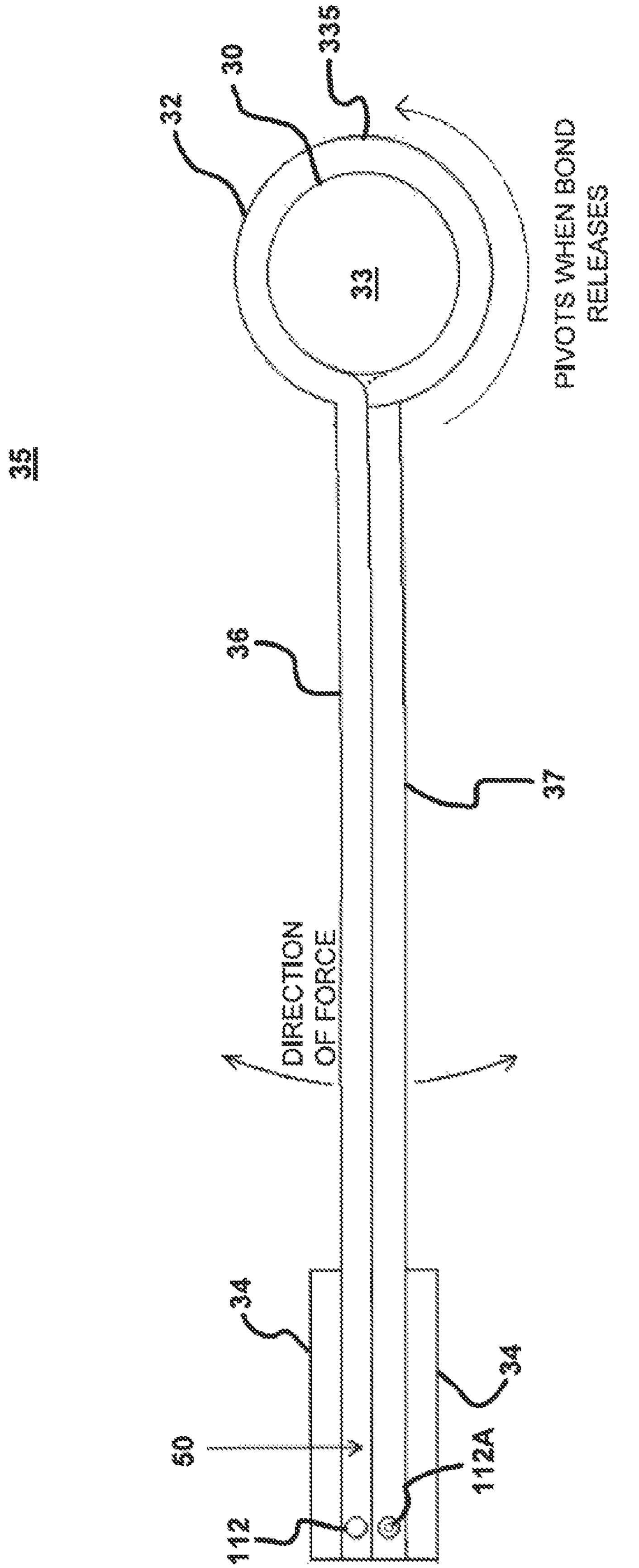
FIG. 3 schematically illustrates a top view of an alternate example of a temperature activated door spring in a loaded position.

Referring now to FIG. 3, a top view of an alternate example of a temperature activated door spring is schematically illustrated. A temperature activated door spring 35 includes a spring 32 having a contiguous upper arm 36. The upper arm 36 has a first bumper 34 attached proximate the end. A second bumper 34 is attached to a contiguous lower arm 37. The spring 32 includes a coil 335. Coil 335 is constructed to form the upper arm 36 at a top end and the lower arm 37 at a bottom end. Coil 335 includes an inner pin hole 33 around which the spring is coiled. A fusible bond 50 is affixed to the upper arm 36 and lower arm 37 to hold them together in a loaded position until the ambient temperature reaches the melting point of the fusible bond 50. In an alternate embodiment, a fusible pellet may be shaped to be inserted into pin holes 112 and 112A to join the upper and lower arms in place of the fusible bond 50.

Figure 4:
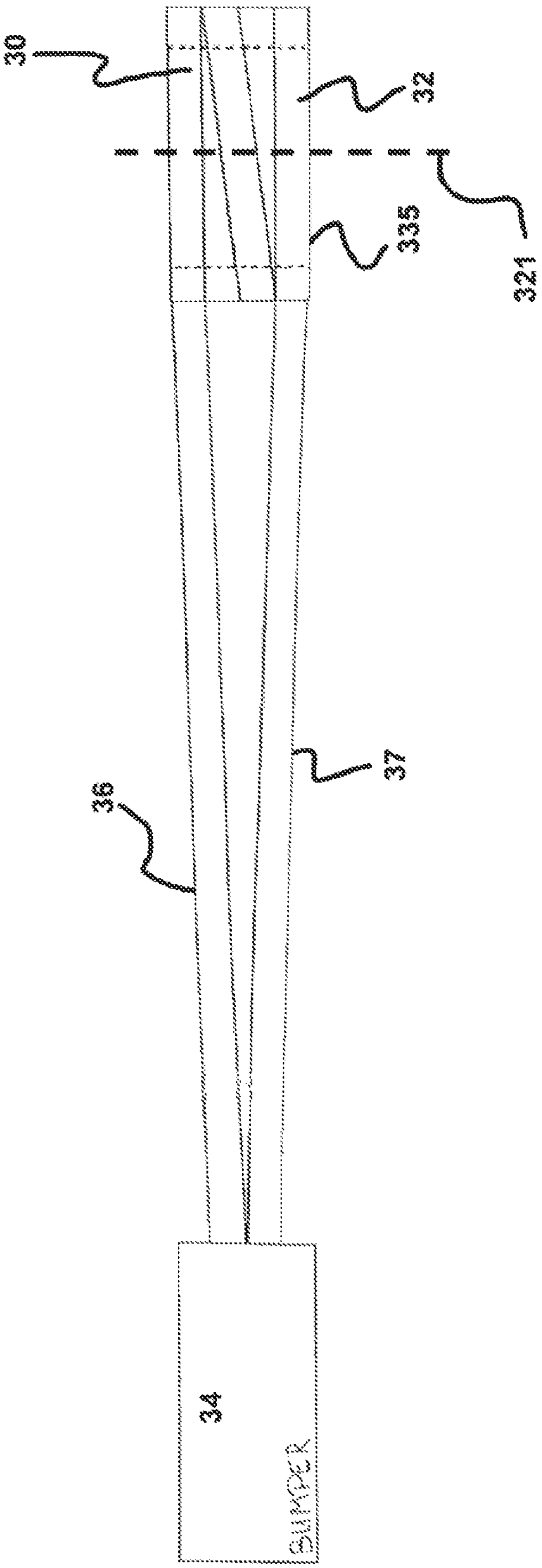
FIG. 4 schematically illustrates a side view of the alternate example of FIG. 3 of a temperature activated door spring in a loaded position.

Referring now to FIG. 4, a side view of an alternate example of FIG. 3 of a temperature activated door spring is schematically illustrated in a loaded position. The upper arm 36 and the lower arm 37 are elongated in a direction generally at a right angle to a central axis 321 projected through the center of the collar 30. The upper arm 36 and lower arm 37 each include a bumper 34 attached to an outside edge at an end opposite the coil end. The upper arm 36 and the lower arm 37 are angled toward each other to meet at the bumper end and are most separated at the coil end of the spring.

Figure 5:
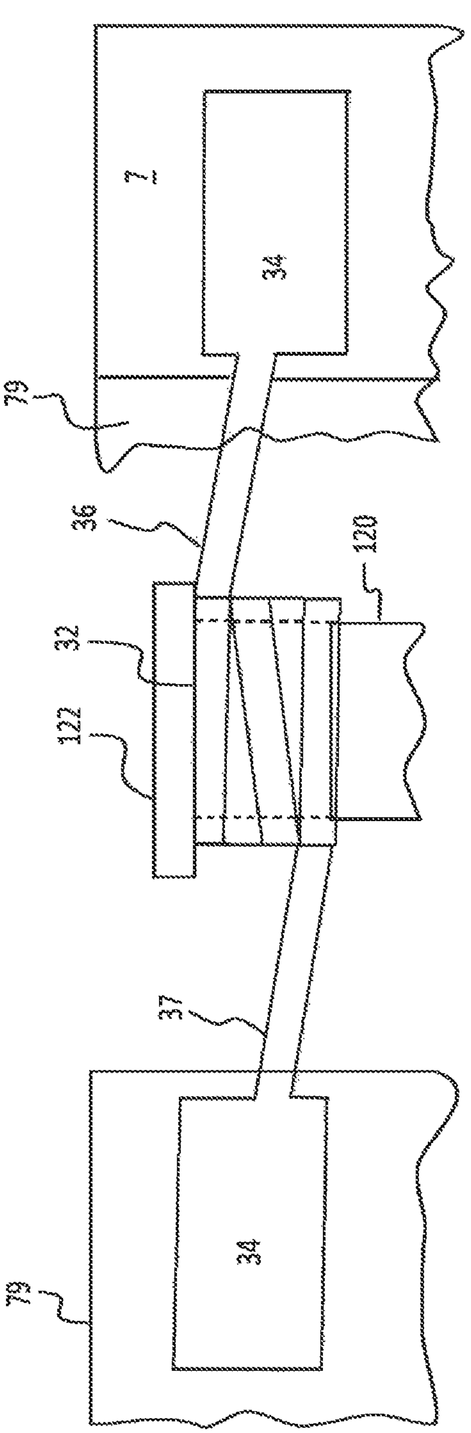
FIG. 5 schematically illustrates a side view of the alternate example of FIG. 3 of a temperature activated door spring after activation.

Referring now to FIG. 5, a side view of the alternate example of FIG. 3 of a temperature activated door spring after activation is schematically illustrated. In this example a hinge pin 120 including pinhead 122 has been inserted into the temperature activated door spring. Ambient temperature conditions would be such that the bond 50 has already melted. Here the upper and lower arms 36, 37 respectively are shown with the temperature activated door spring in the activated position. In one example, upper spring arm 36 bears with a spring force against a door 7, which is attached to the same hinge as the hinge pin, and lower arm 37 applies an opposing spring force against a doorjamb 79 thereby causing the door to close.

Figure 6:
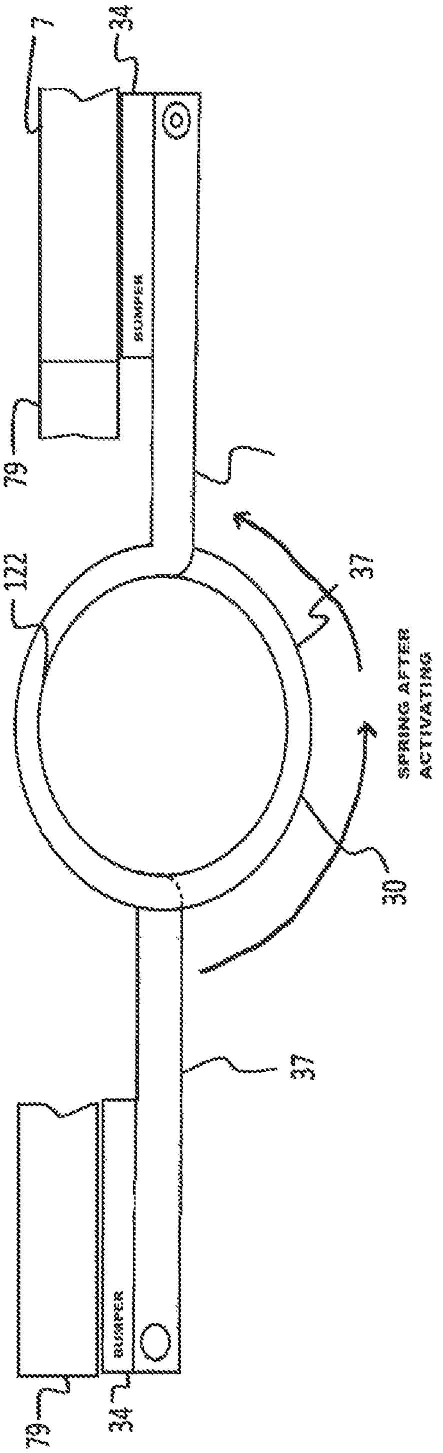
FIG. 6 schematically illustrates a top view of the alternate example of a temperature activated door spring of FIG. 3 after activation.

Referring now to FIG. 6, a top view of the alternate example of the temperature activated door spring of FIG. 3 after activation is schematically illustrated. Here it can be seen that the door 7 is substantially in line with frame 79 in a closed position. The closed position as a result of the upper spring arm and lower spring arm applying opposing force between the hinge and door.

Figure 7:
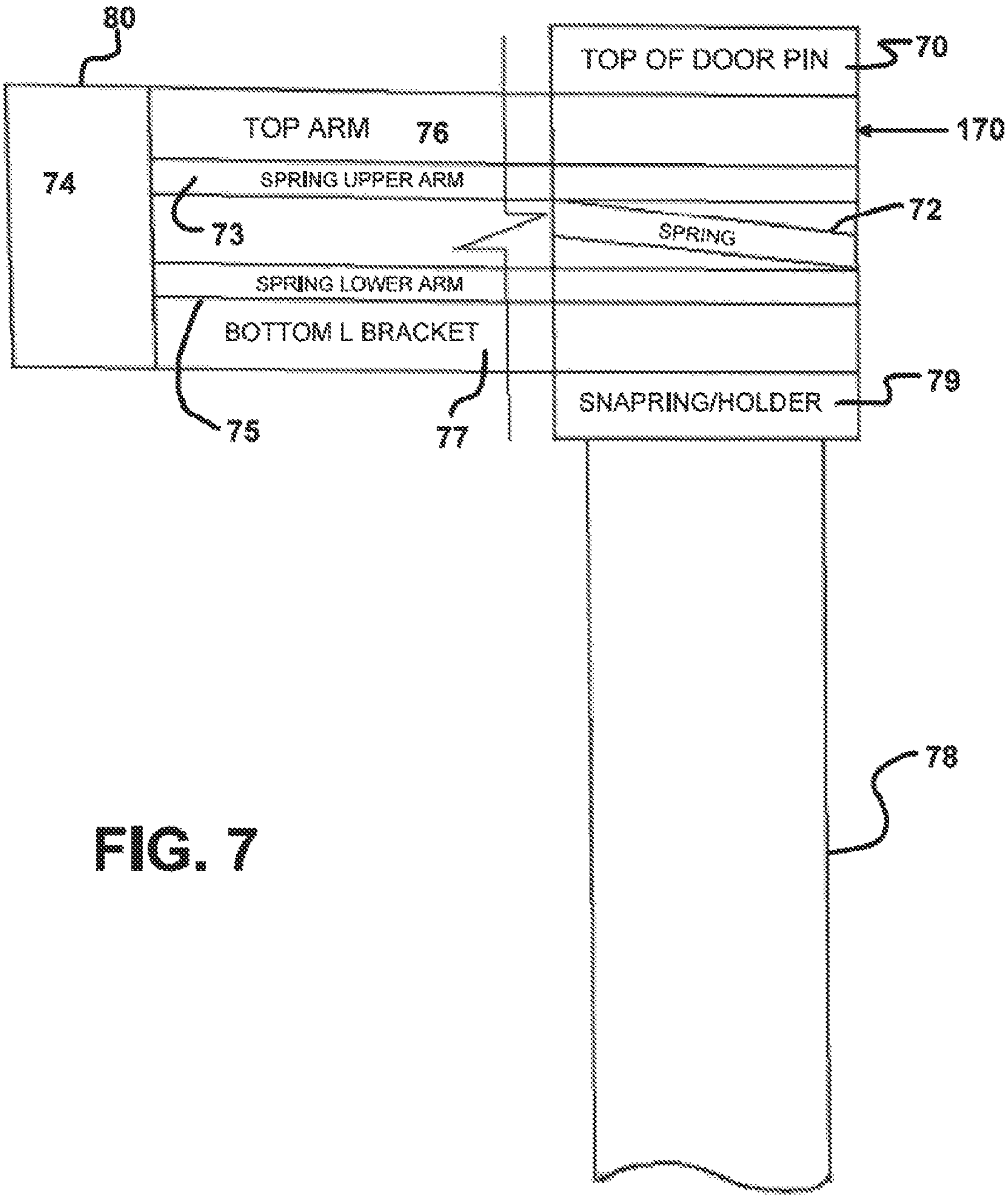
FIG. 7 schematically illustrates a side view of another alternate example of a temperature activated door spring as installed with a hinge pin.

Referring now to FIG. 7, a side view of another alternate example of a temperature activated door spring as installed with a hinge pin is schematically illustrated. A temperature activated door spring 170 includes a coil 72, a top arm 76, a bottom bracket 77, a pair of opposing bumpers 74, a spring upper arm 73 and a spring lower arm 75 and a snap ring holder 79. The top arm 76 includes a leaf 80 and a pinhole 88. The coil 72, spring upper arm 73 and spring lower arm 75 comprise a contiguous spring device. When installed, a door pin having a top 70 and a shaft 78 is inserted through the coil and snap ring holder 79.

Figure 8:
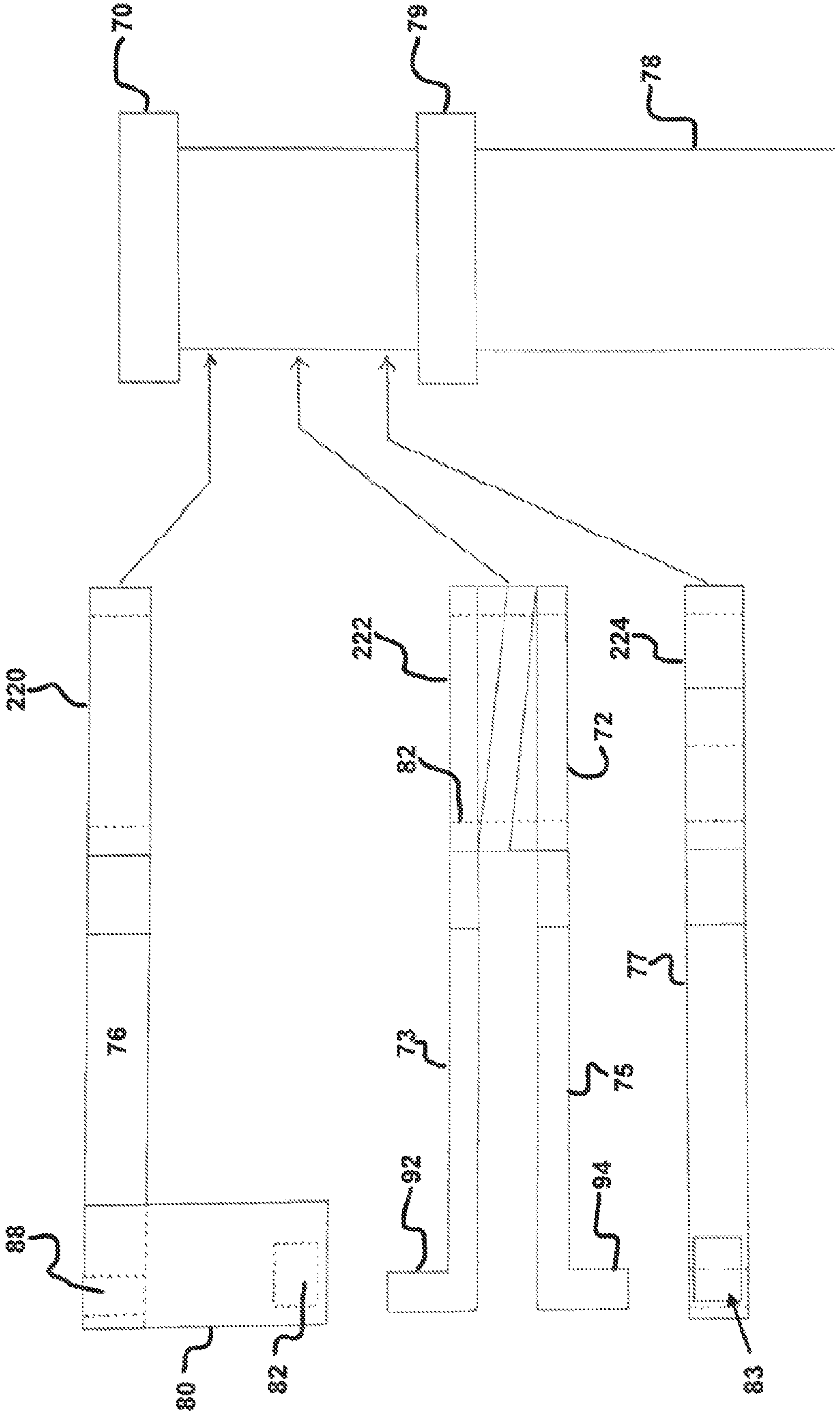
FIG. 8 schematically illustrates an exploded side view of an alternate example of a temperature activated door spring as installed on a hinge pin.
Figure 10:
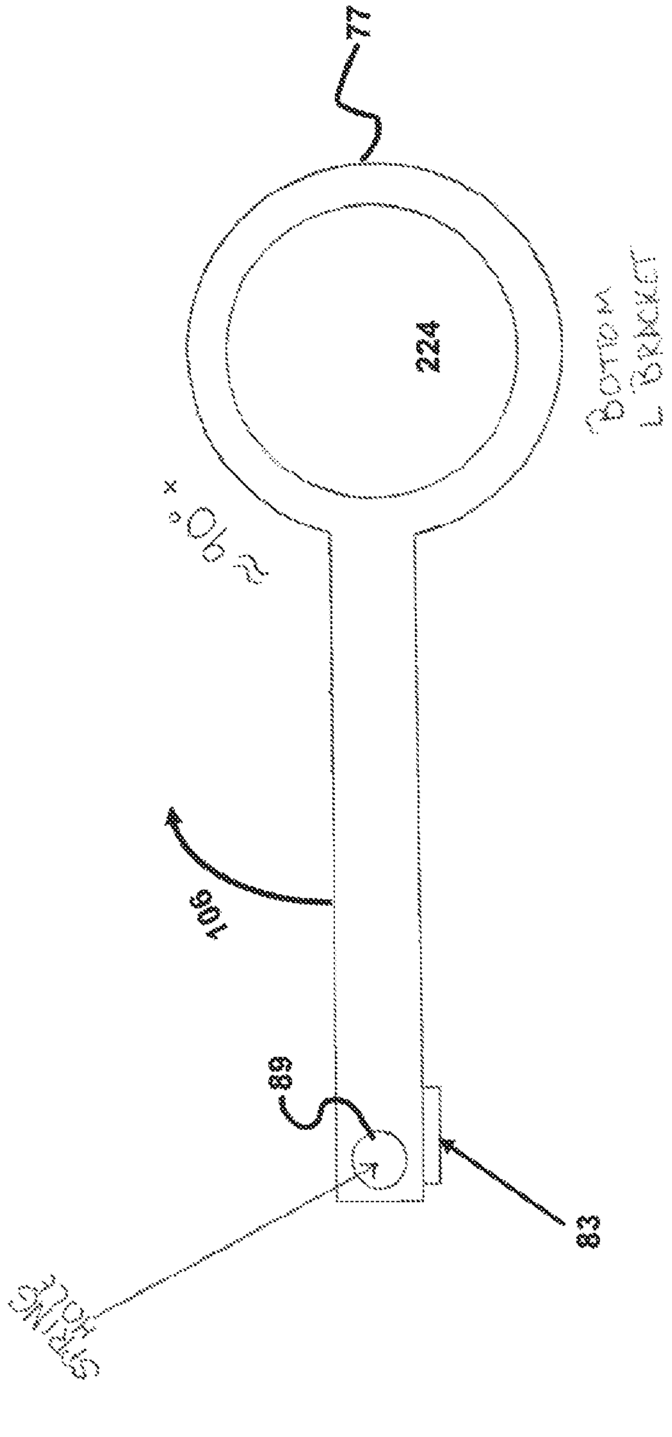
FIG. 10 schematically illustrates a bottom view of a bottom bracket for an alternate example of a temperature activated door spring activation.

Referring now to FIG. 8, an exploded side view of the alternate example of FIG. 7 of a temperature activated door spring as installed on a hinge pin is schematically illustrated. For illustrating the bonding feature, the bumpers 74 have been removed from this illustration. The spring upper arm 73 and spring lower arm 75 each include prongs 92, 94 respectively. The prong 92 is sized to fit into a pinhole 88 in top arm 76. Prong 94 is sized to fit into a similar pinhole 79 (as shown in FIG. 10) in bottom bracket 77. A fusible bond material 83 may be applied to an end of the bottom bracket 77. During manufacture, the fusible bond material 83 is bonded to region 82 of the top arm leaf 80. To accommodate hinge pin 78 insertion, the top arm 76 includes a channel 220, the coil includes a channel 222 and the bottom bracket 77 includes a channel 224. When assembled, the coil 72, the top arm 76, the bottom bracket 77, the spring upper arm 73 and the spring lower arm 75 are captured and held in place between the hinge pin top 70 and the snap ring holder 79.

Figure 9:
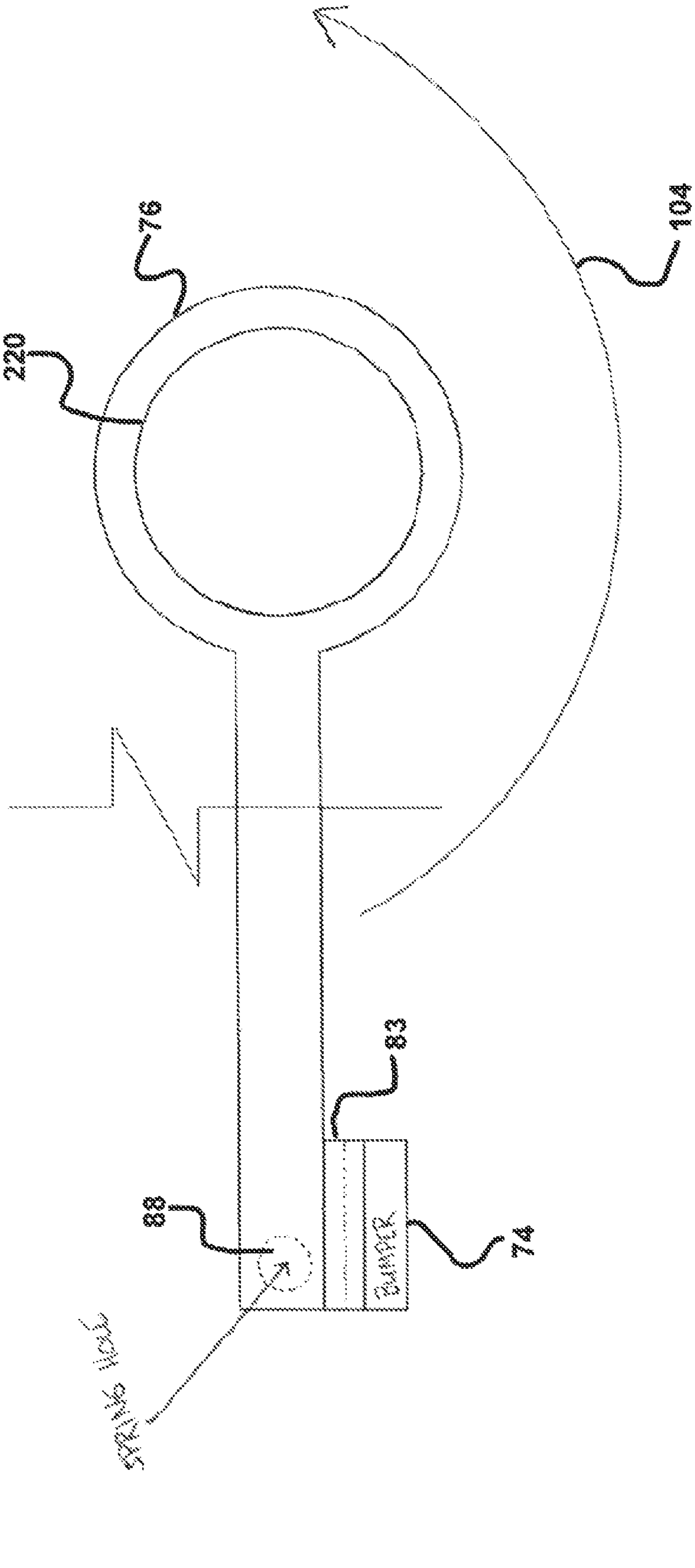
FIG. 9 schematically illustrates a side view of the top arm in an alternate example of a temperature activated door spring activation.

Referring now to FIG. 9, a top view of a top arm used in the alternate example of FIG. 7 for a temperature activated door spring activation is schematically illustrated. The top arm 76 includes a pinhole 88 adapted to accept the prong 92 from the spring upper arm 73. Leaf 83 is affixed between the bumper 74 on one side of the top upper arm 76 at a distance away from the channel 220. Curved arrow 104 represents a force in the direction of pivoting when the bond between the top arm and a bottom bracket melts, thereby releasing the coil spring into an activated position.

Referring now to FIG. 10, a bottom view of a bottom bracket used in the alternate example of FIG. 7 of a temperature activated door spring activation is schematically illustrated. The bottom bracket 77 includes a pinhole 89 adapted to accept the prong 94 from the spring lower arm 75. Pinhole 89 is located proximate the bond 83 on one side of the bottom bracket 77 at a distance away from the channel 224. Curved arrow 106 represents a force in the direction of pivoting when the bond between the top arm and a bottom bracket melts thereby releasing the coil spring into an activated position.

Referring now to FIG. 11, various fusible metals useful for making the fusible pellet and/or a fusible bond are listed. Table 1 lists a plurality of alloys having melting temperatures in the range considered useful for a temperature activated door spring. In one useful example, fusible pellet may comprise a material with a melting point in the range of 107° F.-208° F. In other useful examples, the fusible pellet can be selected from the group consisting of an alloy of bismuth with lead and/or tin, Wood's metal, Rose's metal Field's metal, an alloy of bismuth with lead, tin, indium, cadmium and/or thallium and combinations thereof as shown in Table 1.

Having described the components of a temperature activated door spring, it is considered beneficial to the understanding of the principles herein to describe the operation of the safety mechanism. In one example, the temperature activated door spring operates as a closure mechanism for a door that is actuated during a fire. When activated, the door spring causes the door to automatically close.

The temperature activated door spring may be installed on an existing door hinge and held in place by a hinge pin inserted into knuckles affixed to the hinge. The spring is placed on the door hinge pin, preferably on the upmost hinge knuckle, and then the pin and mechanism is placed in the door hinge. A rotationally tensioned spring holds the temperature activated door spring in a loaded position which is locked-in by a fusible pellet or bond. When installed, the temperature activated door spring is located above the surface of the top hinge knuckle. In a fire, when a predetermined temperature is reached the fusible pellet or bond melts and allows the spring to release. Arms attached to the spring bear against the door and a door frame thereby forcing the door into a closed position. Thus, under ambient temperature conditions the door may be kept open as desired without the need for applying a force such as a doorstop against the door.

Figure 12:
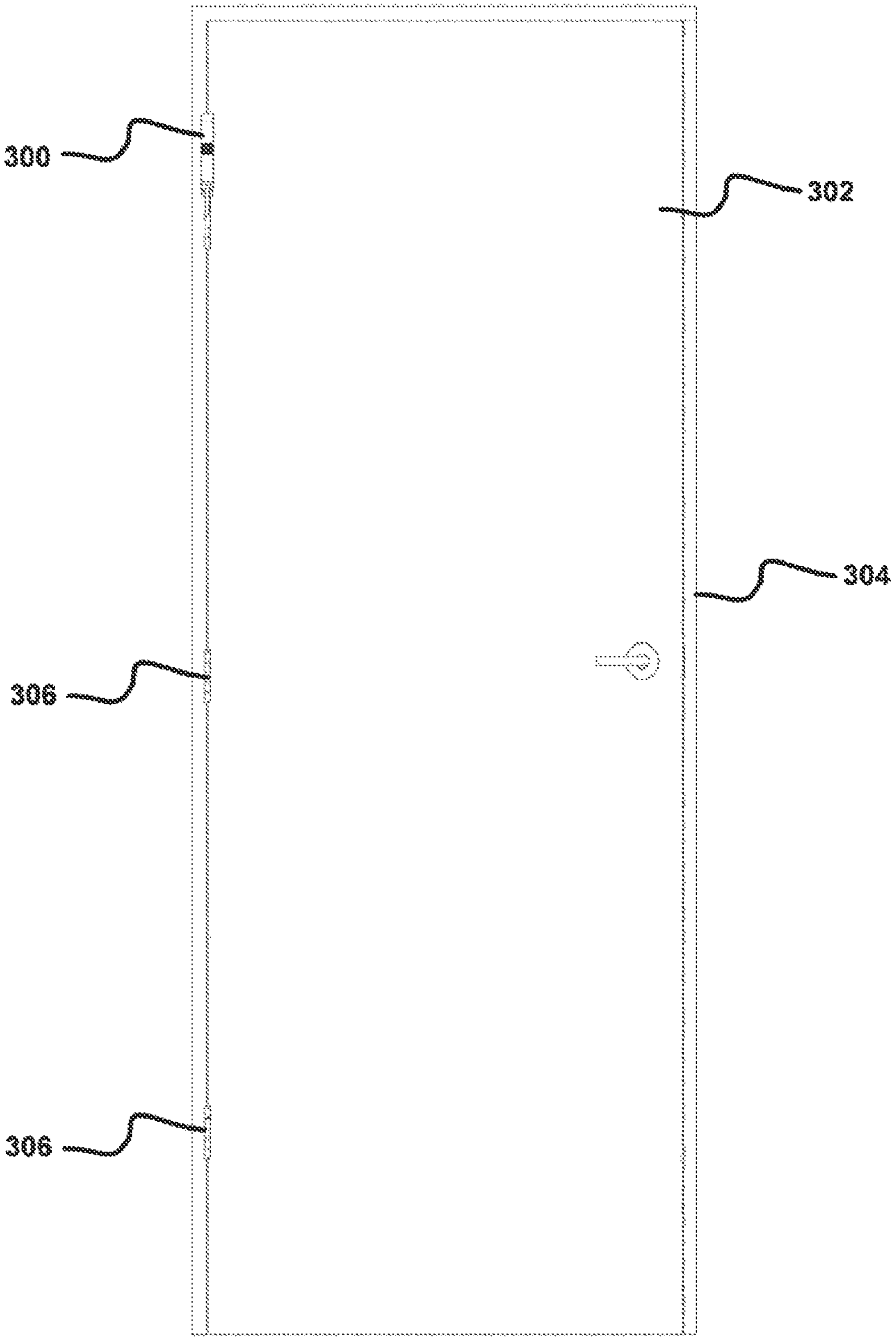
FIG. 12 depicts a door with the device according to preferable embodiments of the present invention installed on the door's upper hinge.
Figure 13B:
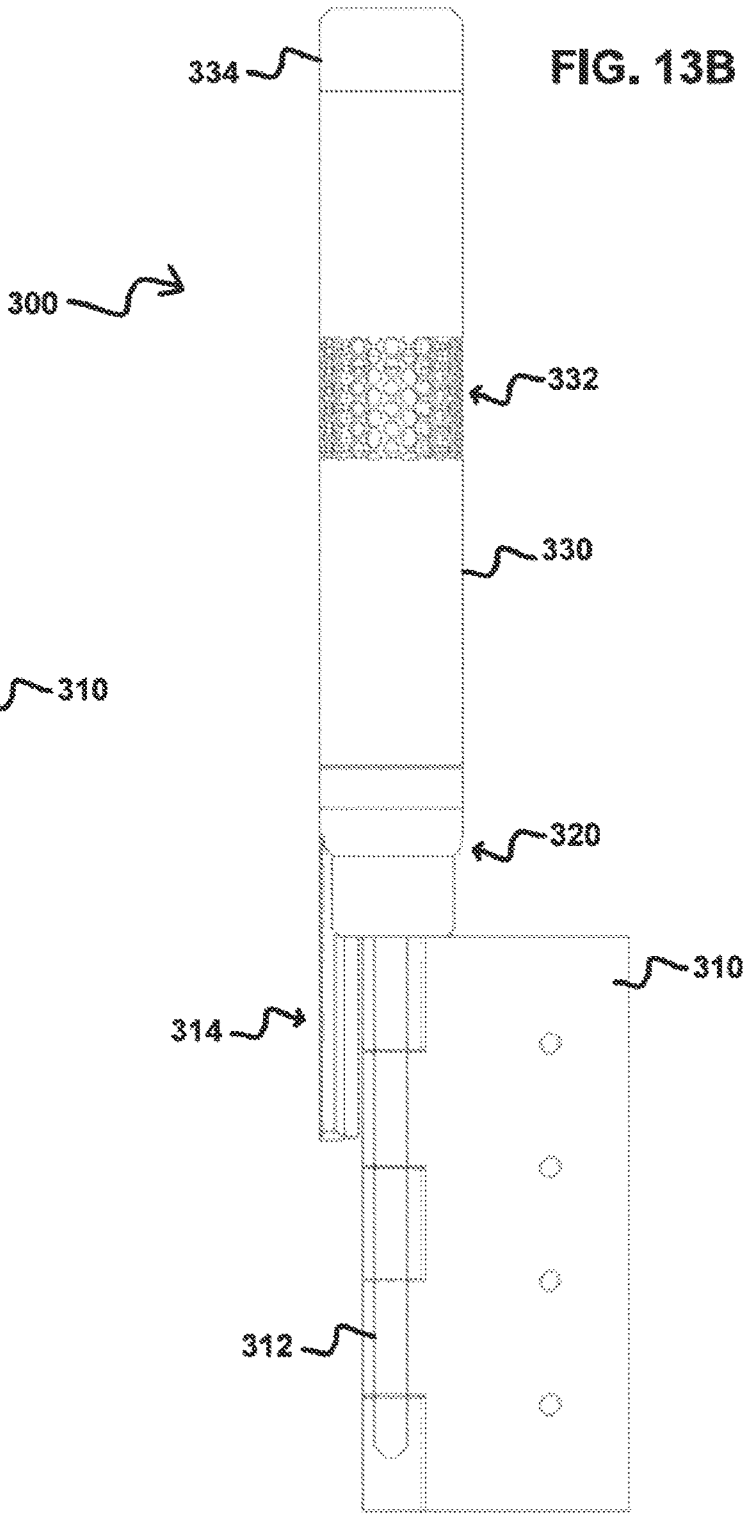
FIG. 13B depicts the installation on a double-leaf door hinge of the device according to the preferable embodiments of the present invention depicted in FIG. 12.
Figure 13A:
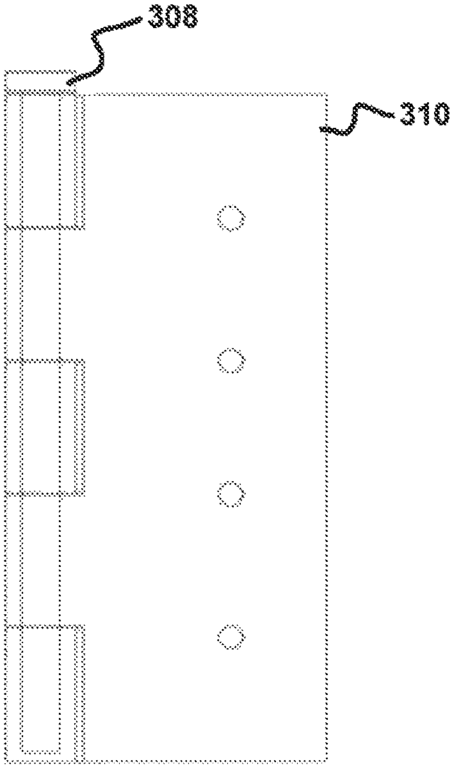
FIG. 13A depicts a standard double-leaf door hinge with hinge retainer pin.

Referring now to FIGS. 12 and 13A-B, the installation of a condition activated door spring device 300 of the present invention on the door hinge 306 of a standard door 302 and door frame 304, in this case the upper door hinge 306, can be seen. The door spring device 300 replaces the hinge retainer pin 308 that typically retains the two leaves 310 of a standard double-leaf door hinge 306, as depicted, to provide the door 302 with the auto-closing technology of the present invention.

Referring next to FIG. 14A-E, a preferable embodiment of the activated door spring device 300 is depicted from various directions. As depicted, the door spring device 300 preferably includes the lower extension spud 312, which is sized to replace the hinge retainer pin 308 within the door hinge 306 when the device 300 is installed for use. The lower extension spud 312 retains the hinge leaves 310 to maintain typical operation of the door hinge 306 and provides secure mounting for the device 300.

The device 300 includes axial arms 314, and specifically at least an inner axial arm 316 and an outer axial arm 318, in preferable embodiments. The inner and outer axial arms 316, 318 are preferably offset such that each applies force against the door 302 or door components, such as the door frame 304, when the device 300 is installed within the door hinge 306. The axial arms 314 apply force in opposite rotational directions when the device 300 is activated, imparting a closing motion upon the door 302.

Also depicted in FIGS. 14A-C is the external cover 322 of the ring gear assembly 320. The ring gear assembly 320, which is shown in greater detail in FIGS. 15-16, preferably includes the ratchet mechanism 324 with rotational tooth array 326, and the rotational force feature that applies rotational force within the ratchet mechanism 324 upon activation of the device 300. The device 300 also preferably includes outer sleeve 330, which provides aesthetic covering for the device's 300 internal components. The outer sleeve 330 also protects against potential pinch points in the internal components and mechanisms of the device 300, and is provided with grip 332 to assist in positioning, inserting, and removing the device 300 in preferable embodiments. Likewise, as depicted, the device 300 is preferably provided with top cap 334 to enclose the device's 300 upper electronics, components, and mechanisms. In some preferable embodiments, grip 332 may also or alternatively be provided on top cap 334.

Referring specifically to FIG. 14D, which depicts device 300 from above, top cap 334 preferably includes speaker sound hole 336, which permits sound to escape from within the device 300. And referring specifically to FIG. 14E, visible are inner and outer axial arms 316, 318, lower extension spud 312, and the pulley 338 and inner ring gear 340 components of the ratchet mechanism 324.

Figure 15A:
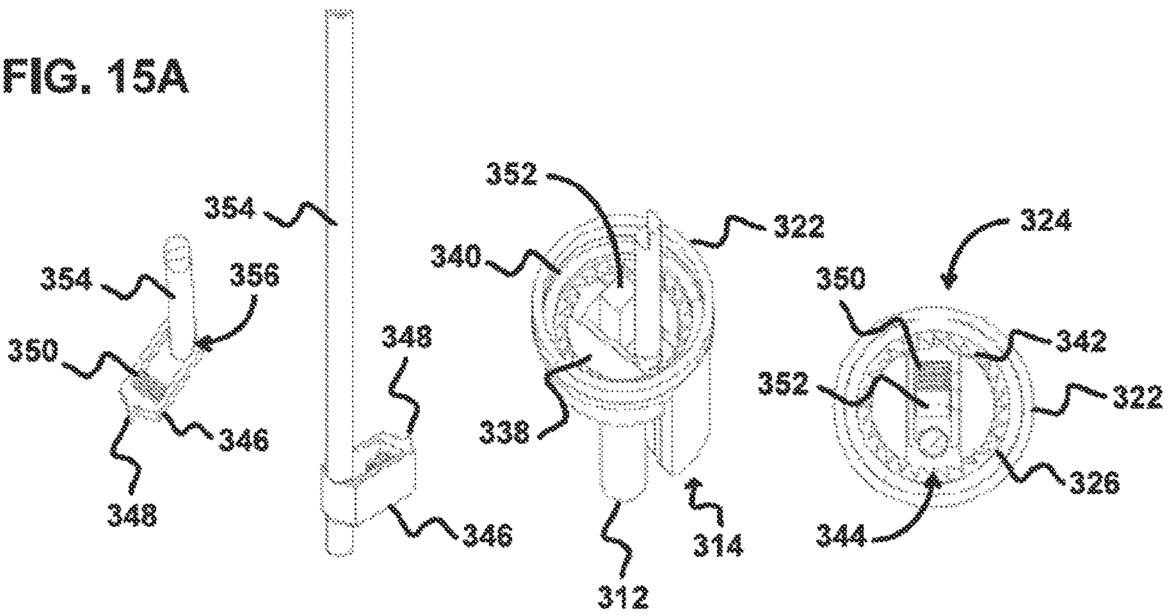
FIG. 15A depicts perspective views of the ratchet mechanism of the device in the pre-activation state according to the preferable embodiments of the present invention depicted in FIGS. 12-14.
Figure 15B:
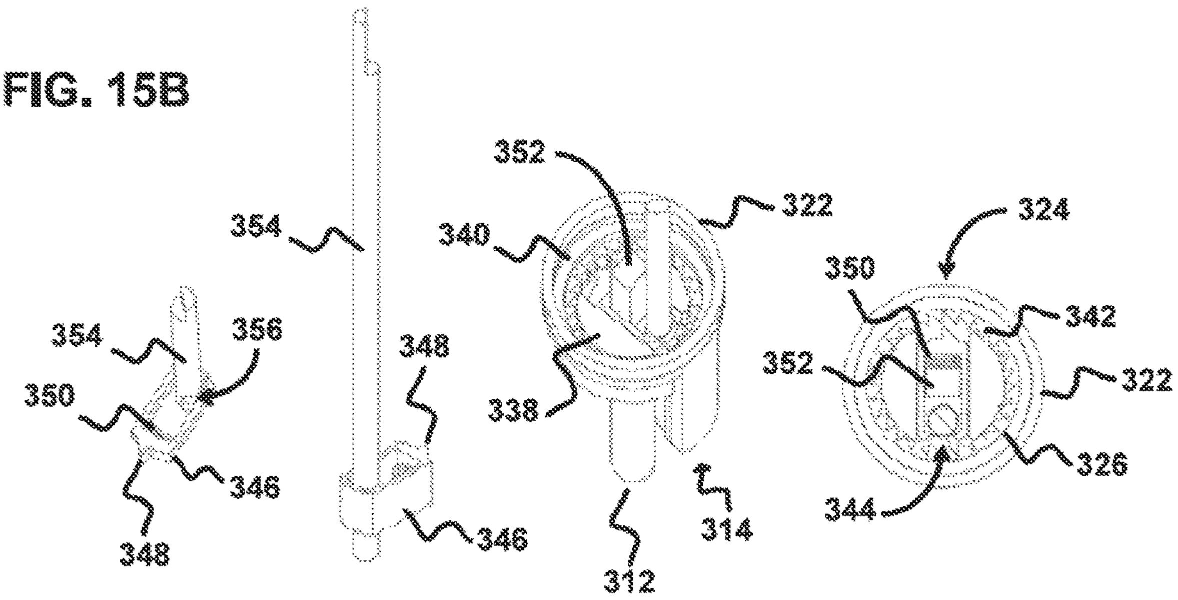
FIG. 15B depicts perspective views of the ratchet mechanism of the device in the post-activation state according to the preferable embodiments of the present invention depicted in FIGS. 12-14 and 15A.

Referring now to FIGS. 15A-B, a detailed depiction of preferable embodiments of the ratchet mechanism 324 and its component parts and operation are depicted. In FIG. 15A, the device 300 and ratchet mechanism 324 and its components are in the pre-activation, ready position. FIG. 15B, meanwhile, depicts the same in the post-activation position.

As depicted, preferable embodiments of the ratchet mechanism 324 include ring gear 340 and a smooth pulley 338 that directly interfaces with the inner teeth 342 of the ring gear 340. The ring gear 340 and smooth pulley 338 form a bearing, permitting rotation of one relative to the other. The smooth pulley 338 preferably includes channel 344 within which resides a ratchet pawl slider 346. The ratchet pawl slider 346 includes at least one tooth extension 348 that extends outwardly and engages with the inner teeth 342 of the ring gear 340. The ratchet pawl slider 346 also includes pawl return spring 350, which bears upon a central retainer shaft 352, biasing the tooth extension 348 of the ratchet pawl slider 346 toward the inner teeth 342 of the ring gear 340 when the device 300 is in the pre-activation, ready position, as depicted in FIG. 15A. The central retainer shaft 352 connects with, indeed is part-in-parcel to, in preferable embodiments, the lower extension spud 312.

As depicted in FIG. 15A, when the device 300 is in the pre-activation, ready position, the pawl return spring 350 is extended and in semi-tension between the ratchet pawl slider's 346 wall and the central retainer shaft 352. Accordingly, the ratchet pawl slider 346 can translate such that the tooth extension 348 can slide relative to the inner teeth 342 of the ring gear 340 when the ratchet pawl slider 346 is rotated in the winding direction, which translation results from the design of the incrementing inner teeth 342. Meanwhile, the incrementing inner teeth's 342 engagement with the tooth extension 348 prevents the ratchet pawl slider's 346 rotation in the unwinding direction unless and until the device 300 enters the activation state due to detection of an adverse condition.

Within the ratchet pawl slider 346 is rotatably disposed the actuator shaft 354. The actuator shaft 354 preferably includes a keyway cutout 356 disposed adjacent to the ratchet pawl slider 346. The keyway cutout 356 permits the ratchet pawl slider 346 to translate to engage the inner teeth 342 of the ring gear 340 due to the tension in the pawl return spring 350 when the actuator shaft 354 is rotated in the pre-activation, ready position, as depicted in FIG. 15A. When the device 300 is activated, due to detection of an adverse condition or otherwise, the actuator shaft 354 rotates such that keyway cutout 356 is no longer adjacent to ratchet pawl slider 346. This causes the ratchet pawl slider 346 to translate, compressing the pawl return spring 350 and disengaging the tooth extension 348 from the inner teeth 342 of the ring gear 340, allowing free rotation of the ring gear 340 relative to the smooth pulley 338, and thereby freeing the inner and outer axial arms 316, 318 to rotate relative to one another and force the door 302 closed.

With the actuator shaft 354 rotated such that the keyway cutout 356 is no longer aligned with the ratchet pawl slider 346, as depicted in FIG. 15B, the pawl is translated to disengage the extension tooth 348 from the inner teeth 342 of the ring gear 340. Notably, this compresses the pawl return spring 350, readying it to re-engage the ratchet pawl slider's 346 tooth extension with the teeth 342 of the inner ring gear 340 once the actuator shaft 354 is returned to its pre-rotation position, realigning the keyway cutout 356 with the ratchet pawl slider 346 and placing the device 300 back into the pre-activation, ready position. At this point, the ratchet mechanism 324 can be re-wound such that the device 300 can be reset and ready to operate once again.

Figure 16A:
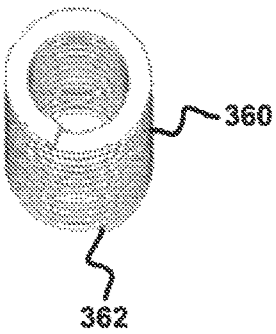
FIG. 16A depicts an isometric view from below of the primary activation spring of the device according to the preferable embodiments of the present invention depicted in FIGS. 12-15.
Figure 16B:
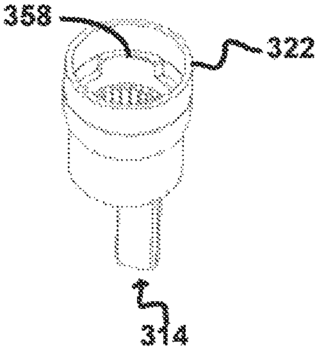
FIG. 16B depicts an isometric view from above of the ring gear assembly of the device according to the preferable embodiments of the present invention depicted in FIGS. 12-15 and 16A.
Figure 16C:
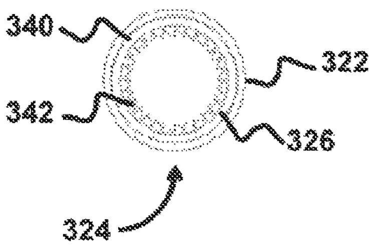
FIG. 16C depicts a perspective view from above of the ring gear assembly of the device according to the preferable embodiments of the present invention depicted in FIGS. 12-15 and 16A-B.

Referring next to FIGS. 16A-C, additional features of the device 300 are depicted in disassembled form. As depicted from above in isometric and plan views in FIGS. 16B and 16C respectively, the ring gear 340 includes an inner ledge 358 preferably disposed above the inner teeth 342. The ring gear 340 is concentrically sized to receive a primary activation spring 360, depicted in FIG. 16A, and a bottom leading edge 362 of the primary activation spring 360 rests and places force upon the inner ledge 358 of the ring gear 340. When the primary activation spring 360 is wound and the device 300 is in the pre-activation, ready position, the primary activation spring 360 imparts its stored energy upon the ring gear 340 through its inner ledge 358. The ring gear 340 is retained in position, however, by the ratchet mechanism 324, as described above, storing the potential energy within the primary activation spring 360 unless and until the device 300 is activated by the detection of an adverse condition.

When the device 300 becomes activated, the stored energy in the primary activation spring 360 is unleashed, with the bottom leading edge 362 pressing against the inner ledge 358 of the ring gear 340, causing the ring gear 340 to rotate relative to the smooth pulley 338 and the outer axial arm 318 to rotate relative to the inner axial arm 316, which are mechanically engaged with, indeed are part-in-parcel to, in preferable embodiments, the ring gear 340 and the smooth pulley 338, respectively. The axial arms 314 thus create rotational force in opposite directions, creating rotation in the door hinge 306 and closing the door 302 when the device 300 is placed in the post-activation state.

Figure 17A:
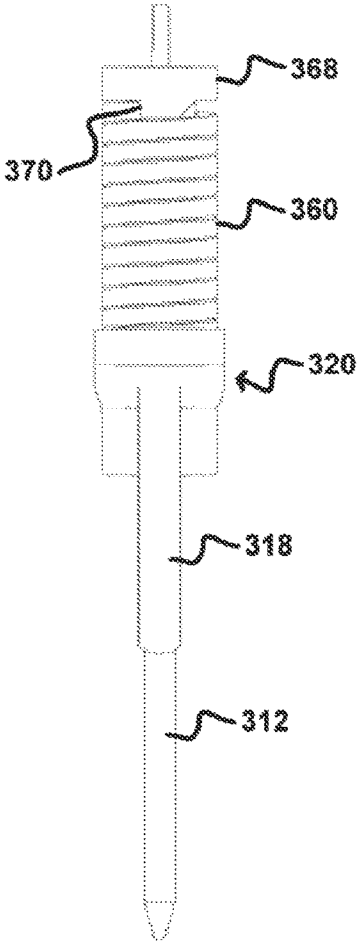
FIG. 17A depicts a perspective view from the front of portions of the device according to the preferable embodiments of the present invention depicted in FIGS. 12-16.
Figure 17B:
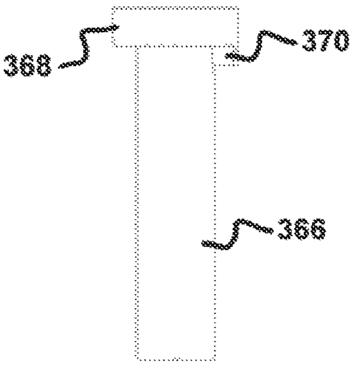
FIG. 17B depicts a perspective view from the side of the core support of the device according to the preferable embodiments of the present invention depicted in FIGS. 12-16 and 17A.
Figure 17C:
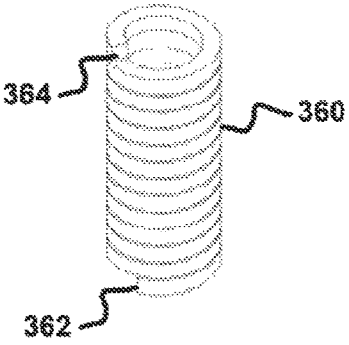
FIG. 17C depicts an isometric view from above of the primary activation spring of the device according to the preferable embodiments of the present invention depicted in FIGS. 12-16 and 17A-B.

Referring next to FIGS. 17A-C, depicted is a preferable assembly of the device 300 of the present invention, including the primary activation spring 360 depicted in FIG. 17C and a core support 366 depicted in FIG. 17B. As depicted, the primary activation spring 360 includes an upper leading edge 364, and the core support 366 includes an upper lateral extension 368 that rests on top of the primary activation spring 360 and an upper retaining surface 370. The upper leading edge 364 of the primary activation spring 360 preferably acts upon the upper retaining surface 370 of the core support 366.

Preferable embodiments of the device 300 thus store potential energy in the primary activation spring 360 through the upper leading edge 364 bearing against the upper retaining surface 370 of the core support 366 and the bottom leading edge 362 bearing against the inner ledge 358 of the ring gear 340. The ring gear 340 and the core support 366 are then rotated relative to one another to create tension in the primary activation spring 360 and the ratchet mechanism keeps the ring gear 340 and the core support 366 from unwinding, thus storing the potential energy within the primary activation spring 360 while the device 300 is in the pre-activation, ready position.

Figure 18:
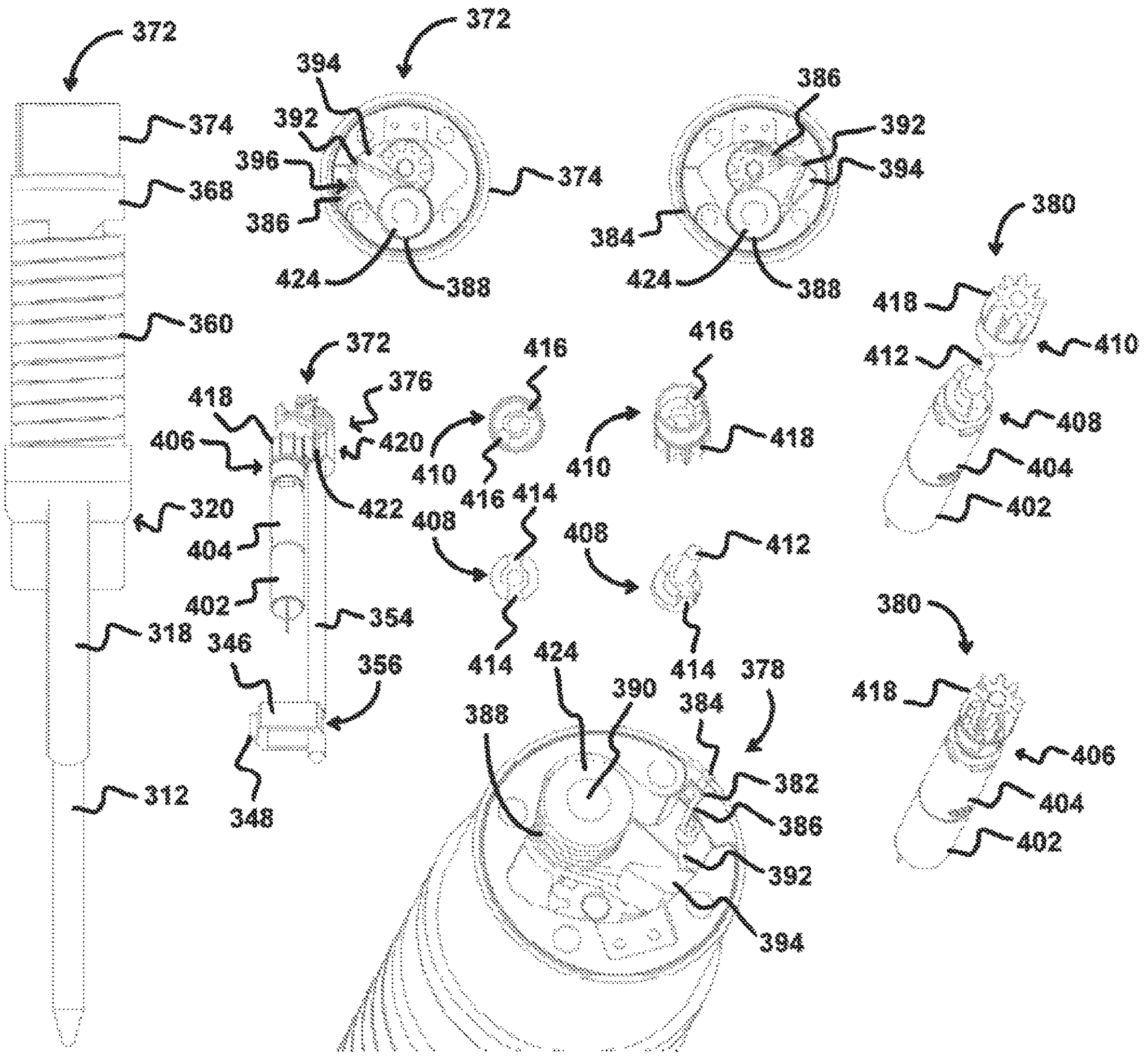
FIG. 18 depicts perspective views of portions and features of the device according to the preferable embodiments of the present invention depicted in FIGS. 12-17.

Referring now to FIG. 18, features of preferable embodiments of the device 300 are depicted in various views. Specifically depicted in FIG. 18 is trigger mechanism 372, which resides within a trigger plate or cover 374 in preferable embodiments. The trigger mechanism 372 preferably includes at least a trigger switch 376, a thermal trigger 378, and an electronic trigger assembly 380. The trigger switch 376 is mechanically connected to the actuator shaft 354 in preferable embodiments, such that rotation of the trigger switch 376 causes responsive rotation of the actuator shaft 354, which in turn causes translation of the ratchet pawl slider 346, removing its tooth extension 348 from engagement with the inner teeth 342 of the ring gear 340 and thereby permitting rotation of the ring gear 340 and its mechanically connected outer axial arm 318 relative to the core support 366 and its mechanically connected inner axial arm 316 due to the release of the stored tension in the primary activation spring 360.

The thermal trigger 378 preferably includes a fusible shunt 382 preferably composed of a small amount of molded, low temperature, fusible alloy residing between a heatsink 384 and a metallic trigger leaf 386. The trigger leaf 386 is preferably connected to and retains a trigger spring 388 coiled around a center spool 390 mechanically associated with the trigger switch 376. The trigger spring 388 also preferably includes an extended motion arm 392, which preferably rests against a switch striker plate 394 and extends at an angle upwardly and into a trigger leaf eyelet 396, mechanically connecting the trigger spring 388 to the trigger leaf 386.

When the ambient temperature around the thermal trigger 378 exceeds the glass transition temperature of the fusible shunt 382, the fusible alloy melts, releasing the trigger leaf 386 and allowing the trigger spring 388 to impact the switch striker plate 394 and impart rotational force upon the trigger switch 376, as depicted in FIG. 18, which in turn rotates the actuator shaft 354 and activates the device 300, as discussed above.

Because the fusible shunt 382 of the thermal trigger 378 melts to trigger activation of the device 300, the thermal trigger 378 operates as a one-time-use failsafe that cannot be reset automatically or through user intervention, in some preferable embodiments. However, those of skill in the art will recognize other, similar designs of the thermal trigger 378 that may be re-usable without departing from the principals of the present invention. Because the thermal trigger 378 operates as a one-time, failsafe activation option in some preferable embodiments of the present invention, the primary method of activation in preferable embodiments of the device 300 is electronic activation.

To achieve electronic activation of the present invention, the device 300 employs the electronic trigger assembly 380, which employs an electric gear motor 402 mechanically connected to a limited, free-rotation, split-junction clutch 406 in preferable embodiments, as depicted in FIG. 18. Preferable embodiments of the electric gear motor 402 use a gear motor shaft 404, and the clutch 406 preferably includes a lower drive clutch 408 and an upper split-junction clutch 410. In preferable embodiments, as depicted in FIG. 18, the lower drive clutch 408 rides on the gear motor shaft 404 and has a central support shaft 412 protruding concentric with the gear motor shaft 404 and with lower drive clutch wings 414. The lower drive clutch wings 414 engage with mating upper split-junction clutch wings 416 of the upper split-junction clutch 410.

In preferable embodiments, the upper split-junction clutch 410 rides on the central support shaft 412 of the lower drive clutch 408 and features an output spline gear 418. The trigger mechanism 372 includes a switch spool lower extension 420 mechanically connecting the trigger switch 376 with the actuator shaft 354, and the switch spool lower extension 420 includes one or more spline teeth projections 422 molded concentrically around at least a portion of the actuator shaft 354 in preferable embodiments, as depicted in FIG. 18. The output spline gear 418 of the lower drive clutch 408 mates with the one or more spline teeth projections 422 of the switch spool lower extension 420 such that rotation of the output spline gear 418 causes responsive rotation of the trigger switch 376 and the mechanically connected actuator shaft 354, thereby activating the device 300. Likewise, counter-rotation in the output spline gear 418 causes responsive counter-rotation of the trigger switch 376 and the mechanically connected actuator shaft 354, thereby resetting the device 300 and transitioning it from the post-activation state back to the pre-activation, ready position.

In preferable embodiments, the limited, free-rotation, split junction clutch 404 may rotate freely up to 330 degrees before engaging the stationary electric gear motor 402, Because the limited free rotation split junction clutch 404 interacts with the one or more spline teeth projections 422 of the switch spool lower extension 420 rather than directly with the trigger switch 376, the electronic trigger assembly's 380 design allows the electric gear motor 402 to drive the trigger switch 376 for activation and reset while also allowing the thermal trigger 378 to activate without having to overcome the torque required to turn the stationary electric gear motor 402, which may be high-torque in preferable embodiments, Thus, the electronic trigger assembly 380 operates to electronically transition the device 300 between pre- and post-activation positions independent of the thermal trigger 378 and its operation.

In preferable embodiments, as depicted in FIG. 18, the trigger mechanism 372 includes spool cap 424 that preferably resides concentrically above the trigger spring 388, which itself preferably resides above the switch spool lower extension 420, and sets recessed on top of the center spool 390 such that the top surface of the spool cap 424 sits flush to the top surface of the center spool 390. The spool cap 424 is a prismatic toroidal magnet in some preferable embodiments, including those depicted in FIG. 18, although other similar components can accomplish the objectives of the spool cap 424, as those of skill in the art will recognize. In preferable embodiments in which the spool cap 424 is magnetic, it may act upon features of device's 300 upper electrical assembly 430, as described in further detail below with reference to FIGS. 19 and 20.

Figure 19:
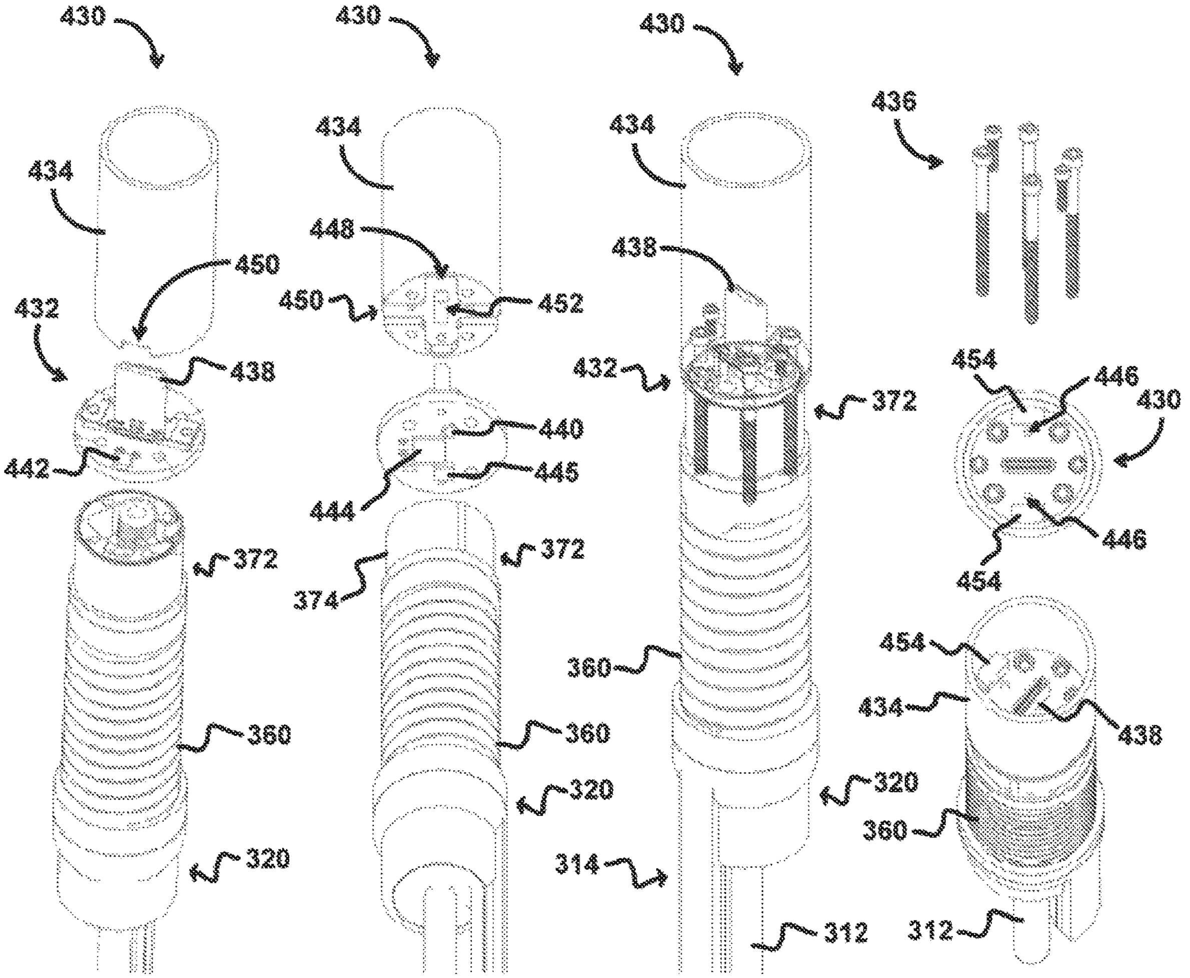
FIG. 19 depicts exploded assembly views of portions of the device according to the preferable embodiments of the present invention depicted in FIGS. 12-18.

Referring now to FIG. 19, the device's 300 upper electrical assembly 430 preferably includes a main circuit board 432 and a smart module cradle 434. The smart module cradle 434 preferably resides above and adjacent to the main circuit board 432, which itself preferably resides above and adjacent to the trigger mechanism 372 residing within the trigger plate or cover 374. Each of the smart module cradle 434, the main circuit board 432, and the trigger mechanism 372 are preferably removably attached through use of one or more concentrically located fasteners 436, as depicted in FIG. 19. Said fasteners may comprise screws or bolts, snaps, or other like fasteners, as will be recognized by those of skill in the art.

The preferable embodiment depicted in FIG. 18 employs 6 concentrically located fasteners 436, 4 of which are elongated to extend through the smart module cradle 434 and the main circuit board 432 and into the trigger mechanism 372, while the remaining 2 are shorter and operate to connect the smart module cradle 434 and the USB-C receptacle plug 438 with the main circuit board 432. The 2 shorter fasteners designated to the upper electrical assembly 430 provide additional strength and rigidity to the USB-C receptacle plug's 438 positioning relative to the main circuit board 432 and the smart module cradle 434.

The spool cap 424 comprising a prismatic toroidal magnet of the trigger mechanism 372 interacts with a magnetic positioning sensor 440 located on the lower surface of the main circuit board 432, in preferable embodiments, helping to orient the trigger mechanism 372 relative to the upper electrical assembly 430 and relay the position of the trigger switch 376 to the main controller electronics assembly 460. Preferable embodiments of the main circuit board 432 also include one or more adverse condition sensors 442, which operate to detect the adverse conditions that are intended to trigger activation of the device 300, as described above.

Also included in preferable embodiments of the main circuit board 432 are a gear motor controller 444, which engages the electric gear motor 402 of the electronic trigger assembly 380, when the one or more adverse condition sensors 442 detect an adverse condition. The main circuit board 432 also preferably includes one or more byte erasable chips 445 (aka EEPROM) to store data and device information, such as the temperature level or saturation level of an adverse condition present in the immediate environment that will trigger activation of the device 300.

Preferable embodiments of the smart module cradle 434 are sized specifically to precisely accommodate and contain the smart module assembly 460. The smart module cradle 434 preferably includes one or more air pressure equalization holes 446, which provide for easy insertion and removal of the smart module assembly 460 within the smart module cradle 434 by preventing resistance due to pressure buildup during insertion or a pressure vacuum during removal.

The one or more air equalization holes 446 reside within a channel 448 formed in the lower end of the smart module cradle 434, in some preferable embodiments. The channel 448 forms a tunnel 450 within which the adverse condition sensors 442 of the main circuit board 432 preferably reside when the device 300 is assembled, providing fluid access between the air within the tunnel 450 and the ambient environment to facilitate the operation of the adverse condition sensors 442.

Also preferably included in the lower end of the smart module cradle 434 is a centrally-located receptacle plug bore 452, which is sized and oriented to receive the USB-C receptacle plug 438 of the main circuit board 432, as depicted in FIG. 19. The fit between the USB-C receptacle plug 438 and the receptacle plug bore 452 is preferably tight to enhance the g-force shock rigidity of the device 300. The smart module cradle 434 also preferably includes one or more raised tabs 454 that aid in the alignment of the smart module assembly 460 and prevent the smart module assembly 460 from applying torsional force on the USB-C receptacle plug 438 and other electrical components of the main circuit board 432.

Figure 20:
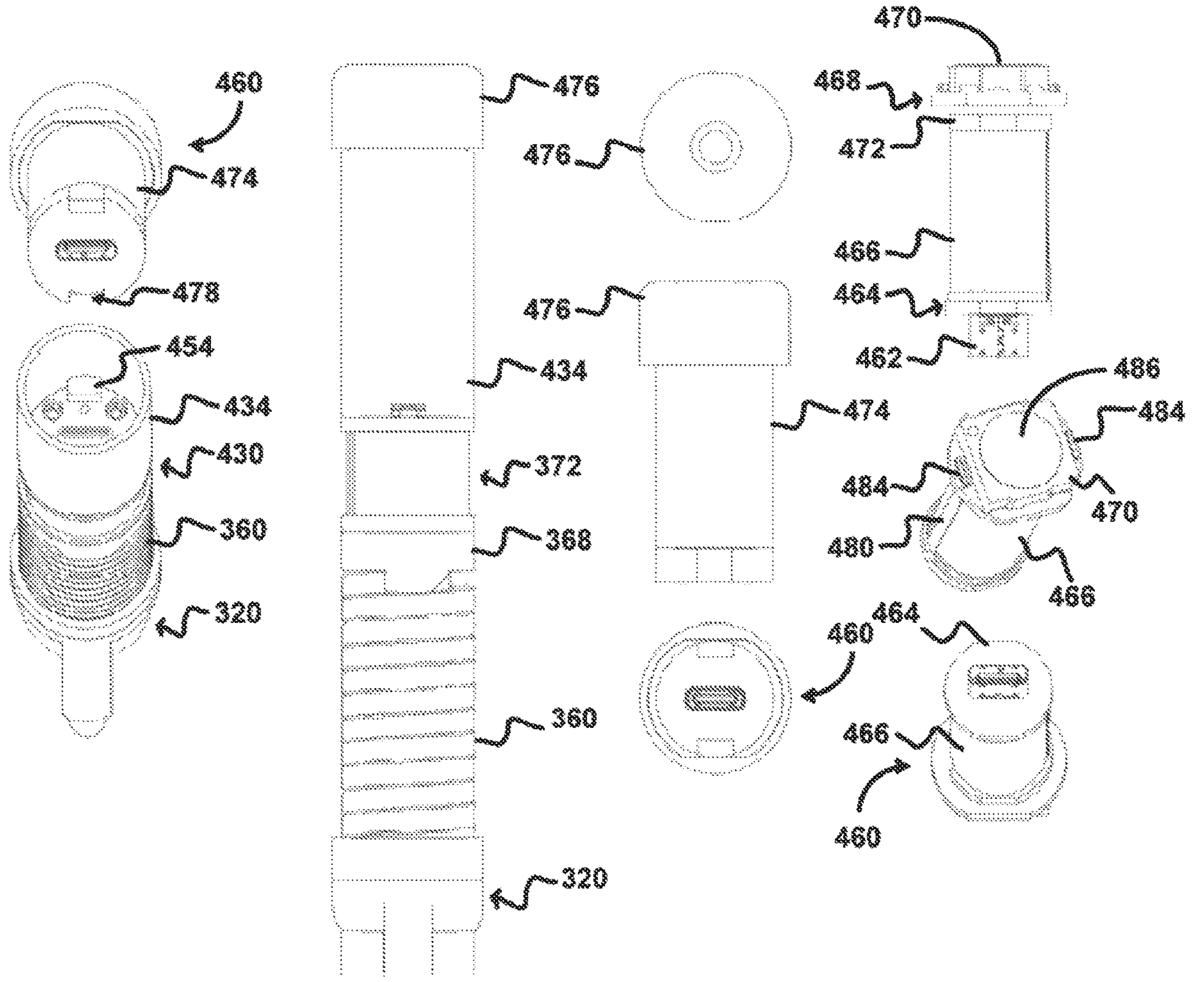
FIG. 20 depicts perspective views of portions and features of the device according to the preferable embodiments of the present invention depicted in FIGS. 12-19.

Referring next to FIG. 20, the components of the smart module assembly 460 and their connection with the remainder of the device 300 is depicted. As depicted in FIG. 20, preferable embodiments of the smart module assembly 460 include a USB connection plug 462 that electronically connects with the USB-C receptacle plug 438 of the upper electrical assembly 430. The USB connection plug 462 is preferably electrically connected to a main power circuit board 464, which is in turn preferably connected to a battery 466. The battery connects the main power circuit board 464 to a smart module circuit board 468, which connects to a speaker 470 in some preferable embodiments, as depicted in FIG. 20. Shock absorbing pads 472 are included between the various components of the smart module assembly 460, in preferable embodiments, to help avoid damage to the electrical components during installation, removal, and activation of the device 300. Each of these components of the smart module assembly 460 is contained within a smart module casing 474 in preferable embodiments, as reflected in FIG. 20.

The smart module assembly 460, contained within the smart module casing 474, slides into a snug fit within the smart module cradle 434, and the USB plug connection 462 of the smart module assembly 460 electronically connects with the USB-C receptacle plug 438 of the upper electrical assembly 430 when the device 300 is fully assembled and ready for installation. Also preferably included is smart module cap 476, which encloses the smart module assembly from above. The smart module cap 476 is transparent, in some preferable embodiments.

When the device 300 is assembled, the smart module assembly 460, preferably encased by the smart module casing 474 and smart module cap 476, is seated fully within the smart module cradle 434 such that the USB connection plug 462 extends downwardly from the main power circuit board 464 and connects within the USB-C receptacle plug 438 of the upper electrical assembly 430. The one or more raised tabs 454 of the smart module cradle 434 preferably align with one or more recesses 478 in the smart module casing 474, assisting in aligning the various components of the device 300 and helping to prevent internal torsion forces from affecting the electrical components. Likewise, the smart module cap 476 is preferably hollow and sized to encircle the smart module circuit board 468, and one or more raised tabs 454 on the smart module cradle 434 fit within one or more recesses 478 in the smart module cap 476 to avoid unwanted torsional force on the smart module circuit board 464, in preferable embodiments.

The main power circuit board 464 hosts the USB connection plug 462 and includes power and signal switching circuitry, in preferable embodiments. The battery 466 preferably rests between two shock absorbing pads 472 such that a shock absorbing pad 472 insulates the battery 466 on both sides, one connecting the battery 466 to the main power circuit board 464 and the other connecting the batter 466 to the smart module circuit board 468. As those of skill in the art will recognize, this arrangement of the battery 466 between a shock absorbing pad 472 on each end is one exemplary arrangement to protect the electronic components of the smart module assembly 460 from damage, and other arrangements are also available and equally effective.

Preferable embodiments of the battery 466 include a metallic strip 480 running from end-to-end along the battery and connecting the battery's 466 anode to the main power circuit board 464 in preferable embodiments, as depicted in FIG. 20. The smart module circuit board 468 preferably hosts the intelligent electronics and radio circuitry for the smart module assembly 460. Preferable embodiments of the smart module circuit board 468 also host a speaker 470 and one or more warning lights 484, preferably LEDs, to assist in notifying individuals of the device's 300 detection of an adverse condition. Preferable embodiments of the smart module assembly 460 also employ one or more dust meshes 486 to protect the electronic components, including the main power circuit board 464 and/or smart module circuit board 468, from dust and other atmospheric agitators.

Figure 21A:
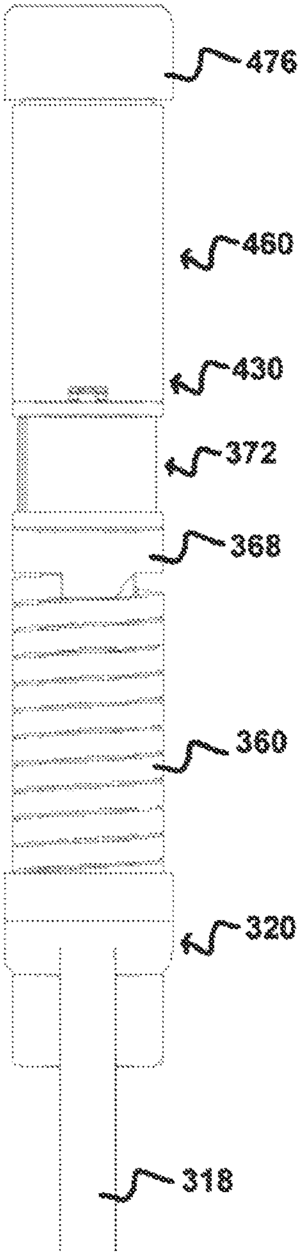
FIG. 21A depicts a partial perspective view from the front of portions and features of the device according to the preferable embodiments of the present invention depicted in FIGS. 12-20.
Figure 21B:
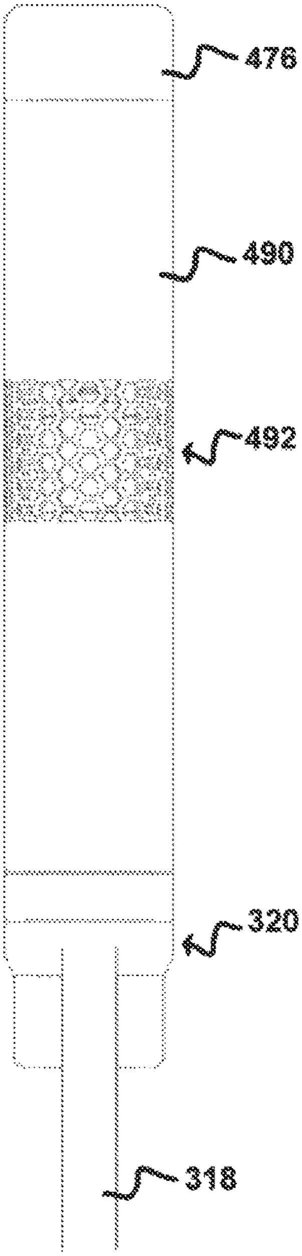
FIG. 21B depicts a partial perspective view from the front of the device according to the preferable embodiments of the present invention depicted in FIGS. 12-20 and 21A.
Figure 21C:
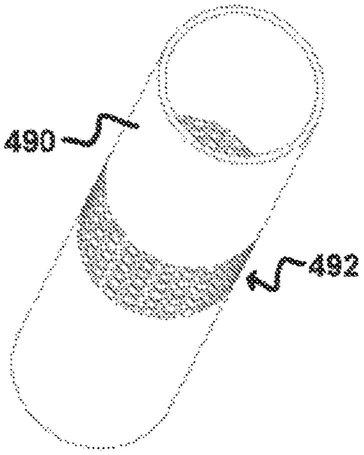
FIG. 21C depicts an isometric view from above of the external cover of the device according to the preferable embodiments of the present invention depicted in FIGS. 12-20 and 21A-B.
Figure 21D:
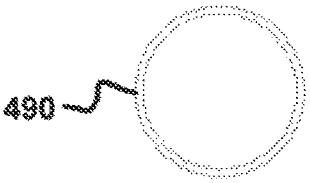
FIG. 21D depicts a perspective view from above of the external cover of the device according to the preferable embodiments of the present invention depicted in FIGS. 12-20 and 21A-C.

Referring now to FIGS. 21A-D, depicted is the assembly of the outer shell 490 over the various internal components of the device 300, in preferable embodiments. FIG. 21A depicts the device 300 before the inclusion of the outer shell 490, while FIG. 21B depicts the device 300 with the outer shell 490 surrounding the internal components. FIGS. 21C-D show the outer shell 490 on its own. As depicted in FIG. 21, the outer shell 490 provides improved aesthetics to the design as well as pinch protection and debris abatement while still permitting the introduction of air and other environmental effects, such as heat and humidity, so that the device's 300 sensors 442 can detect adverse conditions in the surrounding environment.

To facilitate this operation, the outer shell 490 is preferably provided with a series of venting perforations 492. The venting perforations 492 may reside along only a portion of the outer shell 490 or may make up the majority of or all of the outer shell 490, as those of skill in the art will recognize, as well as take any recognizable shape or arrangement so long as sufficient space is created to permit fluid transfer between the internal components of the device 300 and the external environment. The series of venting perforations 492 also assist in gripping the device 300 and facilitate installing and removing the device 300 from the door hinge 306 of a standard door 302.

As depicted in FIG. 21B, the outer shell 490 may be held in position by abutting, at top and bottom ends, the smart module cap 476 of the smart module assembly 460 and the external cover 322 of the ring gear assembly 320, respectively. As those of skill in the art will recognize, various materials are useable for the various components of the device 300, including the outer shell 490, which may be chosen based on aesthetic appearance, cost, etc. without affecting the functionality of the device 300 and its components. While the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings.

Certain exemplary embodiments of the invention have been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment and devices, and that various modifications, both as to the equipment details and operating procedures, may be accomplished without departing from the true spirit and scope of the present invention.

What is claimed is:

1. A condition activated door hinge retainer pin replacement device, comprising:

a lower extension pin sized and shaped to fit within a door hinge of a door a first arm oriented to abut a door frame when the door is open and the device is installed in the door hinge;

a second arm oriented to abut the door when the door is open and the device is installed in the door hinge;

a spring having a coil and being configured to store energy that, when released, forces the first and second arms to rotate in opposing directions;

a condition sensitive module comprising at least one sensor capable of detecting one or more triggering environmental conditions, the condition sensitive module further comprising an activation system that electronically activates the device upon the at least one sensor's detection of a triggering environmental condition;

the activation system comprising a ratchet mechanism and a trigger mechanism, the ratchet mechanism operating to facilitate the winding and storage of energy in the spring by retaining the spring in a pre-activation position, and the trigger mechanism operating to release the spring by placing the device in a post-activation position upon detection of a triggering environmental condition by the at least one sensor of the condition sensitive module; and a power source connected with the condition sensitive module;

wherein upon detection of a triggering environmental condition by the at least one sensor, the activation system operates to release the spring, and the energy stored in the spring operates to rotate the first and second arms in opposing directions, placing rotational force upon the door and door frame to close the door.

2. The condition activated door hinge retainer pin replacement device of claim 1, wherein the condition sensitive module further comprises a speaker and one or more light sources and wherein, upon detection of a triggering environmental condition by the at least one sensor, the activation system activates the one or more light sources and instructs the speaker to output a verbal warning.

3. The condition activated door hinge retainer pin replacement device of claim 1, wherein the one or more triggering environmental conditions is selected from the group consisting of light, sound, temperature, humidity levels, the presence of fire, gas, or smoke, the presence of volatile compounds, contaminations, allergens, vapors, particulate, or atomized compounds, the presence of carcinogenic compounds or airborne biohazards, ultrasound or infrasound detection, radio or electromagnetic radiation detection, and other electronic triggers.

4. The condition activated door hinge retainer pin replacement device of claim 3, wherein the other electronic triggers are selected from the group consisting of radio, optical, sonic, ultrasonic, and quantum methods of communication.

5. The condition activated door hinge retainer pin replacement device of claim 4, wherein the ratchet mechanism comprises:

a ring gear assembly with a series of teeth arranged circumferentially and extending inwardly;

a ratcheting slider disposed within the ring gear assembly, the ratcheting slider comprising a biasing spring and at least one slider tooth extending outwardly and engaging with the teeth of the ring gear assembly; and an actuator shaft rotate-ably connected to the ratcheting slider, the actuator shaft comprising at least one cut-out section located adjacent to the ratcheting slider;

wherein the biasing spring of the ratcheting slider pushes the at least one slider tooth toward the teeth of the ring gear assembly, thereby engaging the ratcheting slider with the ring gear assembly;

wherein the teeth of the ring gear assembly are provided with a straight edge and an angled edge, the angled edge permitting the ratcheting slider to rotate relative to the ring gear assembly upon employment of a rotating force in a ratcheting direction, and the straight edge preventing the ratcheting slider from rotating relative to the ring gear assembly in an unwinding direction opposite the ratcheting direction; and wherein, upon activation of the device due to the at least one sensor's detection of one or more triggering environmental conditions, rotation of the actuator shaft relative to the ratcheting slider withdraws the at least one tooth of the ratcheting slider from engagement with the teeth of the ring gear assembly, permitting rotation of the ratcheting slider relative to the ring gear assembly in the unwinding direction.

6. The condition activated door hinge retainer pin replacement device of claim 5, wherein the trigger mechanism comprises a trigger switch, an electronic trigger assembly, and a thermal backup trigger, the trigger switch being mechanically connected to the actuator shaft such that rotation of the trigger switch causes rotation of the actuator shaft, and the electronic trigger assembly and the thermal backup trigger each operate independently to rotate the trigger switch.

7. The condition activated door hinge retainer pin replacement device of claim 6, wherein the electronic trigger assembly comprises:

an electric gear motor connected with the power source;

a gear motor shaft comprising one or more concentrically extruding spline teeth projections, the electric gear motor operating to rotate the gear motor shaft, the one or more spline teeth projections engaging with one or more counter projections connected with the trigger switch;

wherein, upon activation of the device due to the at least one sensor's detection of one or more triggering environmental conditions, the electric gear motor rotates the gear motor shaft, which in turn rotates the trigger switch and connected actuator shaft, placing the device in the post-activation position.

8. The condition activated door hinge retainer pin replacement device of claim 7, wherein the electric gear motor of the electronic trigger assembly is operable to rotate the trigger switch back after dissipation of the one or more triggering environmental conditions, placing the device back into the pre-activation position.

9. The condition activated door hinge retainer pin replacement device of claim 7, wherein the condition sensitive module comprises an upper electrical assembly and a smart module assembly that are connected and in electronic communication.

10. The condition activated door hinge retainer pin replacement device of claim 9, wherein the upper electrical assembly comprises:

a smart module cradle for receiving and orienting the smart module assembly relative to the upper electrical assembly;

a USB-C receptacle plug;

a main circuit board comprising:

a gear motor controller in electronic communication with the electric gear motor of the electronic trigger assembly;

a magnetic positioning feature that interacts with a toroidal magnet located at an upper end of the trigger mechanism to assist in orienting the main circuit board relative to the trigger mechanism; and one or more fasteners to mechanically connect the main circuit board with the USB-C receptacle plug; and one or more fasteners to mechanically connect the smart module cradle, the main circuit board, and the trigger mechanism.

11. The condition activated door hinge retainer pin replacement device of claim 10, wherein the main circuit board of the upper electrical assembly further comprises one or more byte-erasable chips for storing data and device information.

12. The condition activated door hinge retainer pin replacement device of claim 10, wherein the smart module cradle comprises one or more air pressure equalization passages to facilitate insertion and removal of the smart module assembly without resistance due to air pressure buildup during insertion and due to pressure vacuum during removal.

13. The condition activated door hinge retainer pin replacement device of claim 10, wherein the smart module assembly comprises:

a USB connection plug that electronically connects with the USB-C receptacle plug of the upper electrical assembly when the smart module assembly is inserted into the smart module cradle;

a main power circuit board connected to the power source, the main power circuit board comprising power and signal switching circuitry;

a smart module circuit board connected to the power source, the smart module circuit board comprising connections between the main power circuit board and upper electrical assembly with the at least one sensor of the condition sensitive module;

a smart module casing; and a smart module cap.

14. The condition activated door hinge retainer pin replacement device of claim 13, wherein the USB connection plug, the main power circuit board, and the smart module circuit board reside within the smart module casing and smart module cap, and the smart module assembly is inserted into the smart module cradle of the upper electrical assembly when the device is fully assembled;

the smart module casing comprises one or more recesses that align with one or more raised tabs provided on the interior of the smart module cradle to facilitate orientation and insertion of the smart module assembly; and the smart module assembly further comprises one or more shock absorbing pads to protect electrical components of the smart module assembly during installation, removal, and activation of the device.

15. The condition activated door hinge retainer pin replacement device of claim 6, wherein the thermal backup trigger comprises a thermal trigger spring mechanically connected with the trigger switch and a fusible shunt comprising a low temperature fusible alloy;

wherein the fusible alloy melts when the ambient temperature around the fusible shunt exceeds a known temperature, operating to release tension in the thermal trigger, which operates to rotate the trigger switch and connected actuator shaft, placing the device in the post-activation position.

16. The condition activated door hinge retainer pin replacement device of claim 1, wherein the power source is a battery.

17. A condition activated door hinge retainer pin replacement device, comprising:

a lower extension pin sized and shaped to fit within a door hinge of a door a first arm oriented to abut a door frame when the door is open and the device is installed in the door hinge;

a second arm oriented to abut the door when the door is open and the device is installed in the door hinge;

a spring having a coil and being configured to store energy that, when released, forces the first and second arms to rotate in opposing directions;

a condition sensitive module comprising at least one sensor capable of detecting one or more triggering environmental conditions, the condition sensitive module further comprising an activation system that electronically activates the device upon the at least one sensor's detection of a triggering environmental condition;

a power source connected with the condition sensitive module; and an external shell and cap, wherein the spring, power source, and condition sensitive module reside within the confines of the external shell when the device is fully assembled and installed;

wherein upon detection of a triggering environmental condition by the at least one sensor, the activation system operates to release the spring, and the energy stored in the spring operates to rotate the first and second arms in opposing directions, placing rotational force upon the door and door frame to close the door.

18. The condition activated door hinge retainer pin replacement device of claim 17, wherein the external shell comprises a series of venting perforations that operate to assist a user in gripping the device during installation and removal and permit fluid transfer between internal components of the device and the external environment.

19. A door assembly comprising a door frame, door, and one or more door hinges, each of the one or more door hinges comprising two hinge leaves and a hinge pin connecting the two hinge leaves, wherein the hinge pin of at least one of the one or more door hinges comprises the condition activated door hinge retainer pin replacement device of claim 1.

20. A condition activated door hinge retainer pin replacement device, comprising:

a spring having a coil creating an inner bore sized to receive a standard sized door hinge retainer pin;

a first arm and a second arm, the first and second arms being mechanically connected to the coil;

a pellet hole traversing through at least a portion of the first arm and through at least a portion of the second arm, the pellet hole being sized to receive a fusible pellet;

wherein, when a fusible pellet is inserted into the pellet hole, while the first and second arms are aligned, the fusible pellet holds the first and second arms in a spring-loaded, locked position.

* * * * *